US009426473B2

(12) United States Patent
Yu et al.

(10) Patent No.: US 9,426,473 B2
(45) Date of Patent: Aug. 23, 2016

(54) MODE DECISION SIMPLIFICATION FOR INTRA PREDICTION

(71) Applicant: Qualcomm Incorporated, San Diego, CA (US)

(72) Inventors: Yang Yu, San Diego, CA (US);
Wei-Jung Chien, San Diego, CA (US);
Xianglin Wang, San Diego, CA (US);
Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 13/756,659

(22) Filed: Feb. 1, 2013

(65) Prior Publication Data
US 2014/0219342 A1    Aug. 7, 2014

(51) Int. Cl.
H04N 19/00     (2014.01)
H04N 19/11     (2014.01)
H04N 19/50     (2014.01)
H04N 19/176    (2014.01)
H04N 19/147    (2014.01)
H04N 19/19     (2014.01)

(52) U.S. Cl.
CPC ............ *H04N 19/11* (2014.11); *H04N 19/147* (2014.11); *H04N 19/176* (2014.11); *H04N 19/19* (2014.11); *H04N 19/50* (2014.11)

(58) Field of Classification Search
CPC ..................... H04N 19/176; H04N 19/147
See application file for complete search history.

(56) References Cited

U.S. PATENT DOCUMENTS

| 2003/0202582 | A1* | 10/2003 | Satoh | ............... H04N 19/176 375/240.03 |
| 2007/0036215 | A1 | 2/2007 | Pan et al. | |
| 2009/0060045 | A1 | 3/2009 | Tateno | |
| 2009/0161757 | A1 | 6/2009 | Yu et al. | |

(Continued)

FOREIGN PATENT DOCUMENTS

EP    1808024 A1    7/2007
JP    2007251865    9/2007

OTHER PUBLICATIONS

Ahmad et al., "Video compression with parallel processing," Parallel Computing, Elsevier Publishers, Amsterdam, NL, vol. 28, No. 7-8, XP004375033, ISSN: 0167-8191, Apr. 1, 2001, 40 pp.

(Continued)

*Primary Examiner* — William C Vaughn, Jr.
*Assistant Examiner* — Jerry Jean Baptiste
(74) *Attorney, Agent, or Firm* — Shumaker & Sieffert, P.A.

(57) ABSTRACT

In general, techniques are described for reducing the complexity of mode selection when selecting from multiple, different prediction modes. A video coding device comprising a processor may perform the techniques. The processor may compute approximate costs for a pre-defined set of intra-prediction modes identified in a current set. The current set of intra-prediction modes may include fewer modes than a total number of intra-prediction modes. The processor may compare approximate costs computed for one or more most probable intra-prediction modes to a threshold and replace one or more of the intra-prediction modes of the current set with one or more most probable intra-prediction modes. The processor may perform rate distortion analysis with respect to each intra-prediction mode identified in the current set and perform intra-prediction coding with respect to the current block using a mode of the current set.

40 Claims, 9 Drawing Sheets

(56) References Cited

U.S. PATENT DOCUMENTS

| | | | |
|---|---|---|---|
| 2010/0220790 | A1 | 9/2010 | Jeon et al. |
| 2010/0309977 | A1* | 12/2010 | Andersson ............ H04N 19/176 375/240.12 |
| 2010/0329342 | A1* | 12/2010 | Joshi ................. H04N 19/00672 375/240.16 |
| 2011/0110425 | A1 | 5/2011 | Zhang |
| 2011/0158314 | A1 | 6/2011 | Jeong et al. |
| 2011/0176608 | A1 | 7/2011 | Kim et al. |
| 2012/0106636 | A1 | 5/2012 | Kim et al. |
| 2012/0170652 | A1 | 7/2012 | Guo et al. |
| 2012/0177118 | A1 | 7/2012 | Karczewicz et al. |
| 2012/0224777 | A1 | 9/2012 | Kim et al. |
| 2012/0328014 | A1* | 12/2012 | Lim ....................... H04N 19/61 375/240.12 |
| 2013/0016780 | A1* | 1/2013 | Oh ....................... H04N 19/159 375/240.12 |
| 2013/0101232 | A1* | 4/2013 | Cohen .................... H04N 19/70 382/233 |
| 2014/0219349 | A1 | 8/2014 | Chien et al. |

OTHER PUBLICATIONS

Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Search Report and Written Opinion—PCT/US2014/010231—ISA/EPO—May 21, 2014, 11pp.

Pan et al., "Fast Mode Decision Algorithm for Intraprediction in H.264/AVC Video Coding," IEEE Transactions on Circuits and Systems for Video Technology, IEEE, vol. 15, No. 7, Jul. 2005, 10 pp.

Motra et al., "Fast Intra Mode Decision for HEVC Video Encoder," 2012 20th International Conference on Software, Telecommunications and Computer Networks (SOFTCOM), IEEE, Sep. 11-13, 2012, 5 pp.

Sarwer et al., "Enhanced Low Complex Cost Function for H.264/AVC Intra Mode Decision," 2011 International Conference on Multimedia and Signal Processing (CMSP), IEEE, May 14-15, 2011, 5 pp.

Sarwer et al., "Fast sum of absolute transformed difference based 4×4 intra-mode decision of H.264/AVC video coding standard," Signal Processing: Image Communication, vol. 23, Elsevier Science Publishers, May 5, 2008, 10 pp.

Zhang et al., "Fast Intra Prediction for High Efficiency Video Coding," Advances in Multimedia Information Processing—PCM 2012, Lecture Notes in Computer Science, vol. 7674, Dec. 4-6, 2012, 10 pp.

Zhao et al., "Fast mode decision algorithm for intra prediction in HEVC," Visual Communications and Image Processing (VCIP), 2011 IEEE, Nov. 6-9, 2011, 4 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Response to Written Opinion mailed May 21, 2014, from international application No. PCT/US2014/010231, dated Oct. 31, 2014, 8 pp.

International Preliminary Report on Patentability from corresponding PCT Application Serial No. PCT/US2014/010231 dated Feb. 10, 2015 (8 pages).

Office Action from U.S. Appl. No. 13/760,750 dated Mar. 20, 2015 (13 pages).

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Richardson, "White Paper: H.264 / AVC Intra Prediction," Vcodex, 2002-2011, 7 pp.

U.S. Appl. No. 13/760,750, by Wei-Jung Chien, filed Feb. 6, 2013.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al.,"WD1: Working Draft 1 of High-Efficiency Video Coding", Joint Collaborative Team on Video Coding, JCTVC-C403, Oct. 7-15, 2010, 137 pp.

Amendment to Response to Office Action dated Mar. 20, 2015 from U.S. Appl. No. 13/760,750, filed Jun. 18, 2015, 16 pp.

\* cited by examiner

MODE DECISION SIMPLIFICATION FOR INTRA PREDICTION

TECHNICAL FIELD

This disclosure relates to video coding and, more particularly, intra prediction aspects of video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative Team-Video Coding" (JCT-VC), which is a collaboration between MPEG and ITU-T, are being developed. The emerging HEVC standard is sometimes referred to as H.265, although such a designation has not formally been made.

SUMMARY

In general, this disclosure describes techniques for reducing the complexity of mode selection when selecting from multiple, different prediction modes. Generally, a video coder may code blocks of a picture using intra-mode encoding (e.g., encoded relative to other blocks of the same picture) or inter-mode encoding (e.g., encoded relative to blocks of a previously coded picture). In some examples, a video coder may select a mode to code a given block from a large number of different modes. The video coder may select the mode based on a corresponding approximate cost value that represents an approximate of rate of distortion for the selected mode. Rather than determining approximate cost values for each possible prediction mode, the video coder may reduce the number of modes by initially selecting a subset of modes that are more likely to provide low distortion and subsequently refining the selected subset with a search for additional modes that provide low distortion.

In one embodiment, a method of encoding video data includes computing an approximate cost for each intra-prediction mode identified in a current set of intra-prediction modes that includes a pre-defined set of intra-prediction modes having at least one intra-prediction mode. The current set of intra-prediction modes may include less intra-prediction modes than a total number of intra-prediction modes available for coding a current block of the video data. The method may also include computing an approximate cost for one or more most probable intra-prediction modes for the current block determined based on intra-prediction modes used to encode one or more neighboring blocks of video data adjacent to the current block. The method may further include comparing each of the approximate costs computed for the one or more most probable intra-prediction modes to a threshold. The method may also include replacing one or more of the intra-prediction modes identified in the current set of intra-prediction modes with the one or more most probable intra-prediction modes based on the comparisons. The method may further include performing a rate distortion analysis with respect to each intra-prediction mode identified in the current set of intra-prediction modes to determine a rate distortion cost for each intra-prediction mode identified in the current set of intra-prediction modes. The method may also include performing intra-prediction coding with respect to the current block in accordance with one of the intra-prediction modes identified in the current set of intra-prediction modes based on the determined rate distortion costs to encode the current block.

In one embodiment, a video coding device may be configured to perform an intra-prediction process to code video data, the video coding device. The video coding device may include a processor configured to compute an approximate cost for each intra-prediction mode identified in a current set of intra-prediction modes that includes a pre-defined set of intra-prediction modes having at least one intra-prediction mode, wherein the current set of intra-prediction modes includes less intra-prediction modes than a total number of intra-prediction modes available for coding a current block of the video data. The video coding device may be further configured to compute an approximate cost for one or more most probable intra-prediction modes for the current block determined based on intra-prediction modes used to encode one or more neighboring blocks of video data adjacent to the current block. The video coding device may also be configured to compare each of the approximate costs computed for the one or more most probable intra-prediction modes to a threshold. The video coding device may be further configured to replace one or more of the intra-prediction modes identified in the current set of intra-prediction modes with the one or more most probable intra-prediction modes based on the comparisons. The video coding device may also be configured to perform a rate distortion analysis with respect to each intra-prediction mode identified in the current set of intra-prediction modes to determine a rate distortion cost for each intra-prediction mode identified in the current set of intra-prediction modes. The video coding device may further be configured to perform intra-prediction coding with respect to the current block in accordance with one of the intra-prediction modes identified in the current set of intra-prediction modes based on the determined rate distortion costs to encode the current block.

In one embodiment, a video coding device may be configured to perform an intra-prediction process to code video data, the video coding device including means for computing an approximate cost for each intra-prediction mode identified in a current set of intra-prediction modes that includes a pre-defined set of intra-prediction modes having at least one intra-prediction mode, wherein the current set of intra-prediction modes includes less intra-prediction modes than a total number of intra-prediction modes available for coding a current block of the video data. The video coding device may also include means for computing an approximate cost for one or more most probable intra-prediction modes for the current block determined based on intra-prediction modes used to encode one or more neighboring blocks of video data adjacent to the current block. The video coding device may further include means for comparing each of the approximate costs computed for the one or more most probable intra-prediction modes to a threshold. The video coding device may also include means for replacing one or more of the intra-prediction modes identified in the current set of intra-prediction modes with the one or more most probable intra-prediction modes based on the comparisons. The video coding device may further include means for performing a rate distortion analysis with respect to each intra-prediction mode identified in the current set of intra-prediction modes to determine a rate distortion cost for each intra-prediction mode identified in the current set of intra-prediction modes. The video coding device may also include means for performing intra-prediction coding with respect to the current block in accordance with one of the intra-prediction modes identified in the current set of intra-prediction modes based on the determined rate distortion costs to encode the current block.

In one embodiment, a non-transitory computer-readable storage medium includes instruction stored thereon that, when executed, cause one or more processors to compute an approximate cost for each intra-prediction mode identified in a current set of intra-prediction modes that includes a predefined set of intra-prediction modes having at least one intra-prediction mode, wherein the current set of intra-prediction modes includes less intra-prediction modes than a total number of intra-prediction modes available for coding a current block of the video data. The non-transitory computer-readable storage medium may also include instruction stored thereon that, when executed, cause one or more processors to compute an approximate cost for one or more most probable intra-prediction modes for the current block determined based on intra-prediction modes used to encode one or more neighboring blocks of video data adjacent to the current block. The non-transitory computer-readable storage medium may also include instruction stored thereon that, when executed, cause one or more processors to compare each of the approximate costs computed for the one or more most probable intra-prediction modes to a threshold. The non-transitory computer-readable storage medium may also include instruction stored thereon that, when executed, cause one or more processors to replace one or more of the intra-prediction modes identified in the current set of intra-prediction modes with the one or more most probable intra-prediction modes based on the comparisons. The non-transitory computer-readable storage medium may also include instruction stored thereon that, when executed, cause one or more processors to perform a rate distortion analysis with respect to each intra-prediction mode identified in the current set of intra-prediction modes to determine a rate distortion cost for each intra-prediction mode identified in the current set of intra-prediction modes. The non-transitory computer-readable storage medium may also include instruction stored thereon that, when executed, cause one or more processors to perform intra-prediction coding with respect to the current block in accordance with one of the intra-prediction modes identified in the current set of intra-prediction modes based on the determined rate distortion costs to encode the current block.

The details of one or more examples are set forth in the accompanying drawings and the description below. Other features, objects, and advantages will be apparent from the description and drawings, and from the claims.

DETAILED DESCRIPTION

Figure 1:
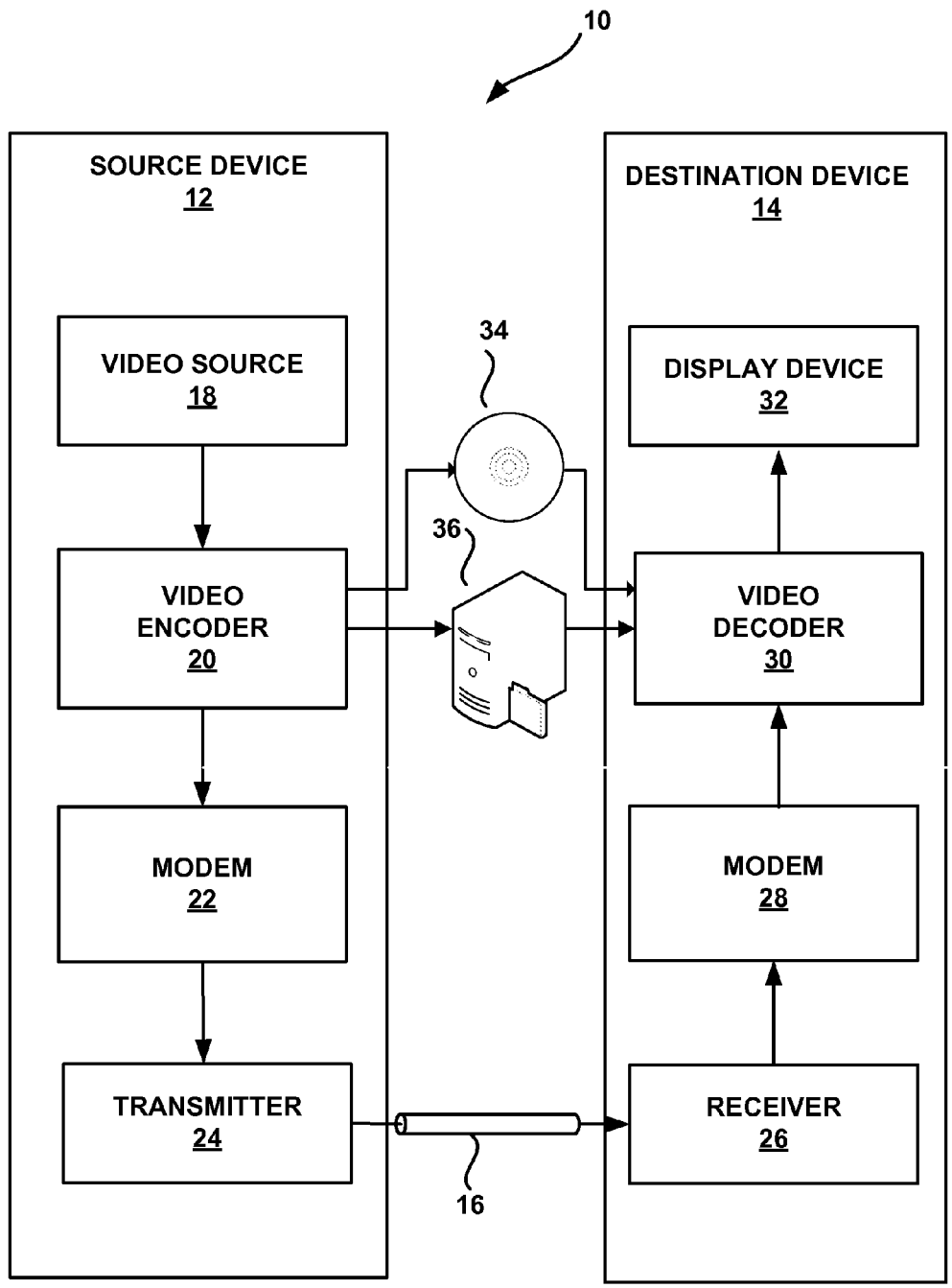
FIG. 1 is a block diagram illustrating an example video encoding and decoding system that may be configured to utilize the techniques described in this disclosure to reduce the complexity of mode selection when selecting from multiple, different prediction modes.

Techniques are described in this disclosure that may enable a video coder, such a video encoder, to reduce the complexity of mode selection when selecting from multiple, different prediction modes. In general, encoded video data may include prediction data and residual data. For example, a video encoder may produce prediction data during an intra-prediction mode or an inter-prediction mode. Intra-prediction, for instance, generally involves predicting the pixel values in a block of a picture relative to reference samples in neighboring, previously coded blocks of the same picture, where the selected previously coded block may be referred to as a reference block. Intra-prediction may also be referred to as spatial prediction because the selected reference block is from the same picture as the block to be predicted. Inter-prediction typically involves predicting the pixel values in the block of a picture relative to one or more reference samples in temporally removed pictures. For this reason, inter-prediction may be referred to as temporal prediction because the selected reference blocks are from pictures different (and therefore temporally removed) from the picture having the block to be predicted.

When performing intra-prediction, the video encoder may select from among multiple, different intra-prediction modes. When performing intra-prediction, the video encoder often analyzes an approximate cost associated with each of the 35 intra-prediction modes. This approximate cost may approximate a full rate-distortion cost. Computing a full rate-distortion cost typically requires that the video encoder compute a predicted block using each of the intra-prediction modes. The video encoder then determines a difference between each of the predicted blocks and the current block (which is commonly referred to as a "residual block" that specifies the residual pixel values referenced above) and transforms each of the residual block from the spatial domain to the frequency domain. Next, the video encoder may quantize each of the transformed residual blocks to generate corresponding encoded video block. Finally, the video encoder may decode the encoded video block, comparing each of the decoded video block to the current block to determine a distortion metric. Moreover, this full rate-distortion analysis involves computing, for each of the intra-prediction modes, the amount of bits used to signal each of the encoded video blocks. Therefore, the video encoder may compute an approximate cost rather than perform this rate-distortion analysis for each of the blocks predicted using a corresponding one of the 35 intra-prediction modes.

In some examples, the video encoder may compute an approximate cost for each of the predicted blocks predicted for each of the intra-prediction modes. For instance, the video encoder may initially compute 35 approximate costs corresponding to each of the 35 intra-prediction modes. The video encoder may then perform full rate distortion analysis for some subset of the intra-prediction modes as the approximate cost may incorrectly approximate a rate distortion cost under certain circumstances.

Although the above simplification using a subset may reduce the amount of computations required compared with brute force searching, such techniques overall may still require 35 calculations of the approximated costs corresponding to each of the intra-prediction modes. While such techniques may reduce the number of times the video encoder performs the computationally-intensive full rate distortion analysis, this process may not be well suited for real-time encoding or near-real-time encoding of video data given the complexity and time required to compute the approximate costs for each of the 35 modes. In some real-time video encoding environments, the processing requirements to compute approximate costs for all possible modes may exceed design constraints.

In accordance with the techniques described in this disclosure, a video encoder may reduce the number of modes to which the approximate, and in some cases full rate distortion analysis, is performed, thereby potentially reducing time and complexity associated with performing an intra-prediction process. By reducing the time and complexity associated with performing the intra-prediction process, the video encoder may perform real-time video encoding or near-real-time video encoding.

In operation, the video encoder may compute an approximate cost for each intra-prediction mode identified in a pre-defined set of intra-prediction modes that includes at least one intra-prediction mode but less than a total number of intra-prediction modes available for coding a current block of the video data. Often, this pre-defined set includes those modes that have been observed to be statistically more likely to be used when performing intra-prediction. In some instances, this pre-defined set may be fixed. In one example, this pre-defined set includes modes 0, 1 and 26. This pre-defined set may, at this point, comprise a current set of intra-prediction modes for the current block. In some instances, the predefined set can be formed by planar mode, most probable modes and angular modes sampled with a sampling offset.

The video encoder may then search for additional intra-prediction modes in a refinement process, adding additional intra-prediction modes to the current set of intra-prediction modes. In some examples, this search may resemble a binary search, starting from the mode in the pre-defined set of intra-prediction modes that has the lowest relative computed approximate cost among the approximate costs computed for each mode identified in the predefined set of intra-prediction modes.

To illustrate, mode 26 may have the lowest approximate cost in the current example. Under this assumption, the binary search may begin from mode 26, where the mode value, i.e., 26, is decremented and incremented by some offset F to arrive at 26+F and 26−F. The video encoder may then compute the approximate costs for each of modes 26+F and 26−F and selects the mode with the lowest approximate costs among the modes 26, 26+F and 26−F. The video encoder may then replace a mode in the current set based on this comparison, e.g., replacing the mode 26 in the current set with the selected mode that has the lowest approximate costs among the modes 26, 26+F and 26−F.

The search then repeats in this manner, halving F to F/2, re-focusing the search on mode 26 (if neither mode 26+F or mode 26−F had an approximate cost less than mode 26), mode 26+F (if mode 26+F was added to the current set) or mode 26−F (if mode 26−F was added to the current set). The search process continues until F is divided into a fractional number (assuming F begins as a value that is a power of two). So if F is set to 4, for example, the process iterates once with F=4, once with F=2, once with F=1 and then terminates when F=0.5.

In this manner, the video encoder may search for additional intra-prediction modes based on the computed approximate costs for the intra-prediction modes identified in the current set of intra-prediction modes. The video encoder may then compute approximate costs for each of the additional intra-prediction modes, adding the additional intra-prediction modes to the current set of intra-prediction modes based on a comparison of the approximate costs computed for each of the intra-prediction modes identified in the current set of intra-prediction modes and the approximate costs computed for the additional intra-prediction modes. Consequently, techniques of this disclosure may simplify mode decision in intra prediction and at the same time the precision of prediction may not be reduced significantly, and coding efficiency may not be significantly sacrificed. The proposed techniques may, in some examples, reduce the number of approximate cost calculations and the number of full rate distortion cost calculations by more than one half.

FIG. 1 is a block diagram illustrating an example video encoding and decoding system 10 that may be configured to utilize the techniques described in this disclosure to reduce the complexity of mode selection when selecting from multiple, different prediction modes. As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, a modulator/demodulator 22 ("modem 22") and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques described in this disclosure, however, are not limited to wireless applications or settings, and may be applied to non-wireless devices including video encoding and/or decoding capabilities. Source device 12 and destination device 14 are, therefore, merely examples of coding devices that can support the techniques described herein.

Video encoder 20 may encode the captured, pre-captured, or computer-generated video. Once encoded, video encoder 20 may output this encoded video to modem 22. Modem 22 may then modulate the encoded video according to a communication standard, such as a wireless communication protocol, whereupon transmitter 24 may transmit the modulated encoded video data to destination device 14. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later retrieval, decoding and consumption. The storage medium 34 may include Blu-ray discs, DVDs, CD-ROMs, flash memory, or any other suitable digital storage media for storing encoded video. Destination device 14 may access the encoded video stored on the storage medium 34 or the file server 36, decode this encoded video to generate decoded video and playback this decoded video.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. Destination device 14 may access file server 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding the associated encoded video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 of destination device 14 represents any type of display capable of presenting video data for consumption by a viewer. Although shown as integrated with destination device 14, display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG 4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, a prediction direction (whether bi-predicted or uni-predicted) and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As previously described, when selecting a mode for intra-prediction, some processes may require calculations of approximated costs corresponding to each possible intra-prediction mode. While some processes may reduce the number of times the video encoder performs the computationally-intensive full rate distortion analysis, this process may not be well suited for real-time encoding or near-real-time encoding of video data given the complexity and time required to compute the approximate costs for each of the possible intra-prediction modes.

In accordance with techniques of the disclosure, video encoder 20 may implement fast mode decision techniques for intra prediction. Video encoder 20 may initially construct a current set of preliminary modes by uniformly sampling all possible intra-prediction modes and filtering out one or more prediction modes in a cut list. Video encoder 20 may then perform a refinery search over the modes of the current set. Finally, video encoder 20 may replace the non-most probable mode of the current set with the largest approximate cost with a most-probable mode associated with the lowest approximate cost based on the relationship of the respective approximate costs of the most probable mode and non-most probable mode. Such techniques of the disclosure may reduce the number of approximate cost calculations, in some examples, to less than 17 and the number of full rate distortion cost calculations to 3 (for PU size of 4×4 and 8×8) and 2 (for PU size bigger than 8×8).

In one example, the video encoder 20 initially determines a set of pre-defined prediction modes that may be statistically more likely to be used when performing intra-prediction. Video encoder 20 may then refine the subset by searching for additional intra-prediction modes that provide approximate costs, e.g., searching for additional intra-prediction modes based on computed approximate costs for the intra-prediction modes identified in the current set of intra-prediction modes. For instance, video encoder 20 may identify an intra-prediction mode in the search that provides lower approximate costs. Based on an approximate distortion cost associated with the identified intra-prediction mode, video encoder 20 may add the identified mode to a current set (that includes the pre-defined prediction modes) and/or replace a pre-defined mode in the subset with the identified mode.

In this way, video encoder 20 may refine the current set of prediction modes to include modes that provide low approximate costs, while generating approximate costs for only a subset of all possible intra-prediction modes. Consequently, video encoder 20 may perform full rate distortion analysis only for those intra-prediction modes identified in the current set (e.g., a subset of intra-prediction modes) rather than all possible intra-prediction modes. Since the number of intra-prediction modes in the current set may be less than the total number of intra-prediction modes and provide lower approximate costs, techniques of the disclosure may reduce the complexity and processing requirements to perform mode selection. In some examples, reducing such processing requirements may improve video coding performance in parallel- and/or serial-processing video coders.

Video decoder 30 may receive a bitstream comprising coded data and decode the data in accordance with corresponding syntax elements received from video encoder 20. Video decoder 30 may generally perform reciprocal operations to those described above with respect to video encoder 20. That is, video decoder 30 may entropy decode each block of encoded video data, perform inverse quantization to de-quantize the block of encoded video data and apply an inverse transform to transform the de-quantized block of encoded video data form the frequency domain to the spatial domain. This transformed block of encoded video data may represent a reconstructed version of the residual data. In the prediction process, video decoder 30 may select a corresponding prediction mode to decode a given block based on syntax elements that signal prediction modes. That is, video encoder 20 may, in accordance with techniques of the disclosure, send one or more syntax elements that signal a prediction mode for a given block, which video decoder 30 may subsequently use to decode the given block.

Figure 2:
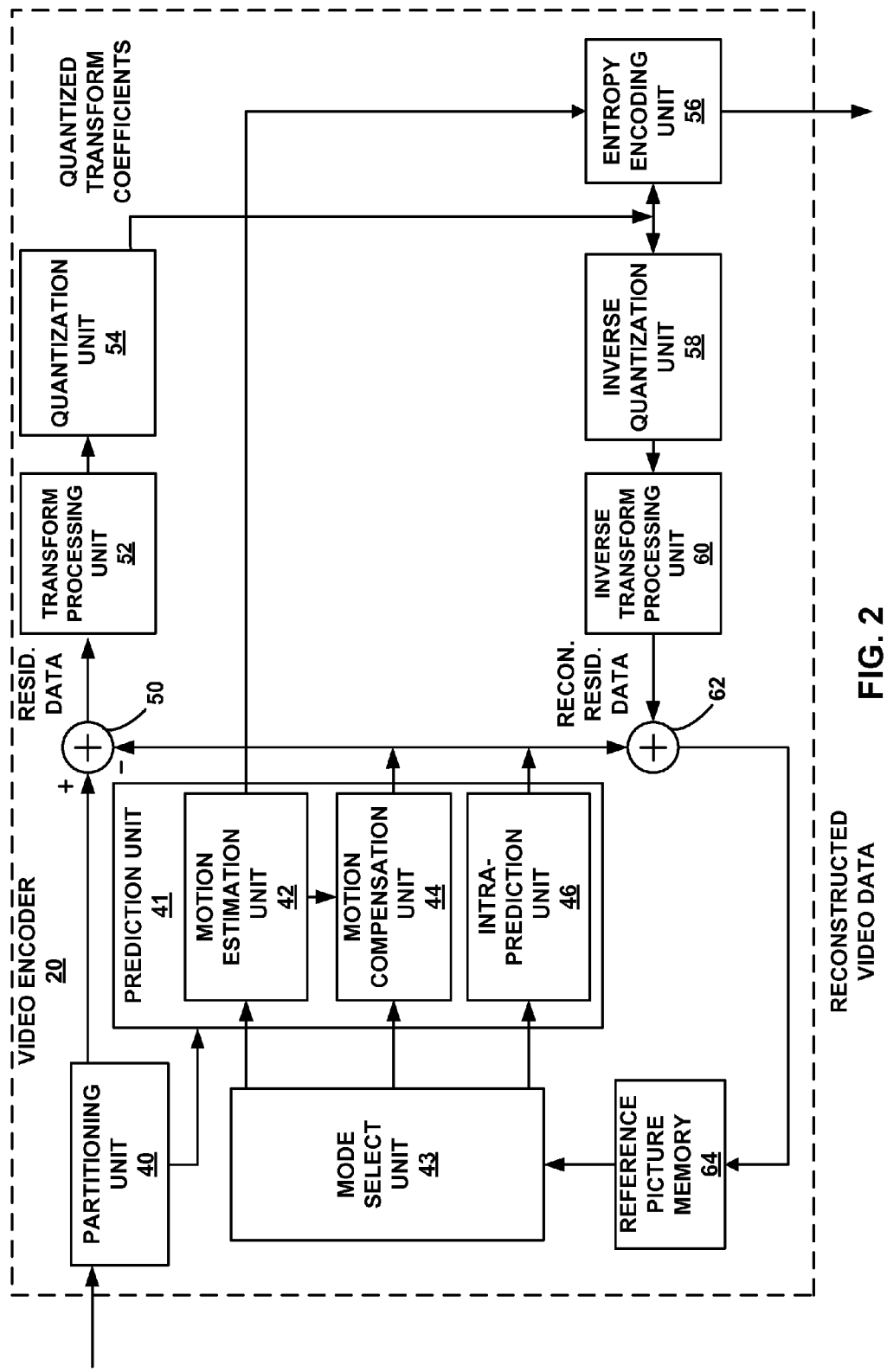
FIG. 2 is a block diagram illustrating an example of a video encoder that may implement techniques to reduce the complexity of mode selection when selecting from multiple, different prediction modes.

FIG. 2 is a block diagram illustrating an example of video encoder 20 that may implement techniques to reduce the complexity of mode selection when selecting from multiple, different prediction modes Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 40, prediction unit 41, reference picture memory 64, summer 50, transform processing unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Video encoder 20 also includes a mode select unit 43. Mode select unit 43 may select one of the coding modes, intra or inter, e.g., based on error results. As further described in FIG. 2, mode select unit 43 may implement techniques for reducing the space required to store rate distortion values when selecting from multiple, different prediction modes.

As shown in FIG. 2, video encoder 20 receives video data, and partitioning unit 40 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. In general, a slice may be divided into multiple video blocks (and possibly into sets of video blocks referred to as tiles).

Mode select unit 43 may select one of a plurality of possible coding modes, such as one of a plurality of intra coding modes or one of a plurality of inter coding modes, for the current video block based on error results (e.g., coding rate and the level of distortion). Prediction unit 41 may provide the resulting intra- or inter-coded block to summer 50 to generate residual block data and to summer 62 to reconstruct the encoded block for use as a reference picture. In some examples, mode select unit 43 may analyze each of the reconstructed video blocks to select a best rate-to-distortion ratio through a process commonly referred to as "rate-distortion optimization," which may be abbreviated as "RDO." Further details of FIG. 2 described below illustrate mode selection techniques in accordance with one or more aspects of the disclosure.

Aspects of this disclosure generally relate to intra-coding. As such, certain techniques of this disclosure may be performed by mode select unit 43. That is, for example, mode select unit 43 may perform the techniques of this disclosure described with respect to FIGS. 2-8 below. In other examples, one or more other units of video encoder 20, e.g., intra-prediction unit 46, may additionally, collectively, or alternatively be responsible for performing the techniques of this disclosure.

Motion estimation unit 42 and motion compensation unit 44 within prediction unit 41 perform inter-predictive coding of the current video block relative to one or more predictive blocks in one or more reference pictures to provide temporal compression. Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction unit 46 within prediction unit 41 may perform intra-predictive coding of the current video block relative to one or more neighboring blocks in the same picture or slice as the current block to be coded to provide spatial compression. Accordingly, intra-prediction unit 46 may intra-predict a current block, as an alternative to the inter-prediction performed by motion estimation unit 42 and motion compensation unit 44, as described above.

In particular, mode select unit 43 may determine an intra-prediction mode to use to encode a current block based on amounts of rate distortion corresponding to a given mode and block. In some examples, intra-prediction unit 46 may encode a current block using various intra-prediction modes received from mode select unit 43, e.g., during separate encoding passes.

Mode select unit 43 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Mode select unit 43 may calculate ratios from the distortions and rates for the various encoded blocks to determine which intra-prediction mode exhibits the best rate-distortion value for the block. According to the proposed HEVC standard, there may be up to 35 intra-prediction modes, and each intra-prediction mode may be associated with an index.

When performing intra-prediction, mode select unit 43 may analyze an approximate cost associated with each possible intra-prediction modes rather than performing full rate distortion analysis. This approximate cost may approximate a rate-distortion cost. Computing a full rate-distortion cost typically requires that the video encoder compute a predicted block using each of the intra-prediction modes, determine a difference between each of the predicted blocks and the current block (which is commonly referred to as a "residual block" that specifies the residual pixel values referenced above), transform each of the residual blocks from the spatial domain to the frequency domain, quantize the coefficient values in each of the transformed residual blocks to generate a corresponding encoded video block of coefficients, and then decode the encoded video block, comparing each of the decoded video blocks to the current block to determine a distortion metric. Moreover, this full rate-distortion analysis may involve computing, for each of the intra-prediction modes, the amount of bits used to signal each of the encoded video blocks, given a quantization level.

As described above, rather than performing full rate-distortion analysis for each of the predicted blocks predicted using a corresponding one of the 35 intra-prediction modes, mode select unit 43 may compute an approximate cost for one or more intra-prediction modes. Mode select unit 43 may compute the approximation of the full rate-distortion cost using various mathematical processes. Some example processes may be generally referred to as Lagrangian rate distortion approximations. In order to determine a best mode out of a large number of possible modes, a Lagrange multiplier may be applied to measure the cost for each different mode. A Lagrange multiplier may be based on a distortion measure, D, and a rate measure, R. The distortion measure could be defined differently for different implementation, for example sum of square error (SSE), sum of absolute difference (SAD), or sum of absolute transform difference (SATD). The rate measure represents how many bits are needed to encode the current mode information. For example, the rate measure may include the bits that are used to signal prediction mode type, intra mode index, or motion vector, etc. Once the values of D and R are obtained, the cost, C, may be calculated as shown in equation (1), where $\lambda$ is a pre-defined constant:

$$C = D + \lambda * R \quad (1)$$

Mode select unit 43 may select the best mode by choosing the mode which yields the minimum C.

As one example, mode select unit 43 may compute a sum of squared distortion (SSD), a sum of absolute difference (SAD) and a sum of absolute transform differences (SATD). Mode select unit 43 may compute the SATD as a way by which to approximate the rate-distortion cost. Mode select unit 43 may compute the SATD in accordance with the following equation (2):

$$J(\text{SATD}) = \Sigma_{i,j} |T_{N \times N}(X(i,j) - \widehat{X(i,j)})| + \lambda \cdot R_{mode} \quad (2)$$

In equation (2), $\hat{X}$ represents the predicted block for current block X, $T_{N \times N}(\bullet)$ is a N×N transform (such as the Hadamard Transform), $\lambda$ is the Lagrange multiplier (which may be selected empirically), and $R_{mode}$ is the number bits used to encode the mode. Consequently, J(SATD) cost may be an approximation of full rate distortion with reduced complexity.

Typically, when the current block is of size 4×4 or 8×8, a video encoder may analyze eight to ten intra-prediction modes having a lowest approximate cost in comparison to the remaining 27 to 25 intra-prediction modes. When the current block is larger than 8×8, the video encoder may analyze three to five intra-prediction modes having a lowest approximate cost in comparison to the remaining 32 to 30 intra-prediction modes. In some examples, a video encoder may also consider so called "most probable" intra-prediction modes during intra-prediction coding. To identify this most probable mode, a video encoder may identify an intra-prediction mode of previously encoded blocks (which are often neighboring blocks that are adjacent to the current block). The most probable modes may have a relatively high probability of being the same or similar to the current block due to a spatial proximity of the neighboring blocks to the current block.

In HEVC, there are three most probable modes. The first two are the intra prediction modes of the above and left PUs if those PUs are available and are coded using an intra prediction mode. Any unavailable prediction mode is considered to be intra DC mode. When the two most probable modes are not equal, the third most probable mode is set equal to Intra_Planar, Intra_DC or Intra_Angular[26] (vertical), according to which of these modes, in this order, is not a duplicate of one the first two modes. When the first two most probable modes are the same, if this first mode has the value Intra_Planar or Intra_DC, the second and third most probable modes are assigned as Intra_Planar, Intra_DC, or Intra_Angular[26], according to which of these modes, in this order, are not duplicates. When the first two most probable modes are the same and the first mode has an Intra_Angular value, the second and third most probable modes are chosen as the two angular prediction modes that are closest to the angle (i.e. the value of k) of the first.

In some examples, the video encoder may compute an approximate cost for each of the predicted blocks predicted and for each of the intra-prediction modes. For instance, the video encoder may initially compute 35 approximate costs corresponding to each of the 35 intra-prediction modes. The video encoder may then perform full rate distortion analysis for some subset of the intra-prediction modes as the approximate cost may incorrectly approximate a rate distortion cost under certain circumstances.

While the simplification of performing full rate distortion analysis on a subset of modes may reduce the amount of computations required compared with brute force searching, such techniques overall still require 35 calculations of the approximated costs corresponding to each of the 35 intra-prediction modes. Therefore, although these techniques may reduce the number of times the video encoder performs the computationally-intensive full rate distortion analysis, this process may not be well suited for real-time encoding or near-real-time encoding of video data given the complexity and time required to compute the approximate costs for each of the 35 modes.

In order to reduce the complexity of mode selection, this disclosure describes techniques to reduce the number of modes that are applied using full rate distortion analysis by initially selecting a subset of modes that are more likely to provide low approximate cost and subsequently refining the selected subset with a search for additional modes that provide lower approximate cost. The techniques may enable a video encoder, such as video encoder 20, to select a best mode, e.g., a mode with a lowest rate distortion to encode a current block. By reducing the time and complexity associated with performing the intra-prediction process, the techniques may promote improved real-time video encoding and/or near-real-time video encoding.

To illustrate, mode select unit 43 may initially perform the techniques described in this disclosure to determine a current block to encode from partitioning unit 40. Mode select unit 43 may compute an approximate cost for each intra-prediction mode identified in a current set of intra-prediction modes that includes a pre-defined set of intra-prediction modes having at least one intra-prediction mode. The current set of intra-prediction modes may include less intra-prediction modes than a total number of intra-prediction modes available for coding a current block of the video data. Often, the pre-defined set of intra-prediction modes includes those modes that have been observed to be statistically more likely to be used when performing intra-prediction. That is, in some examples, mode select unit 43 may determine one or more statistics that indicate the number of occurrences that one or more modes are selected. Based at least in part on the statistics, mode select unit 43 may select the modes included in the first set of intra-prediction modes.

In some instances, the pre-defined set may be fixed. In one example, this pre-defined set includes modes 0, 1 and 26. This pre-defined set may, at this point, comprise a current set of intra-prediction modes for the current block. In some instances, the predefined set can be formed by planar mode, most probable modes and angular modes sampled with a sampling offset, as further described below. Since the planar mode and the most probable modes may appear often as the final selected mode, mode select unit 43 may determine approximate costs of these respective modes and the modes to the current set.

Figure 4A:
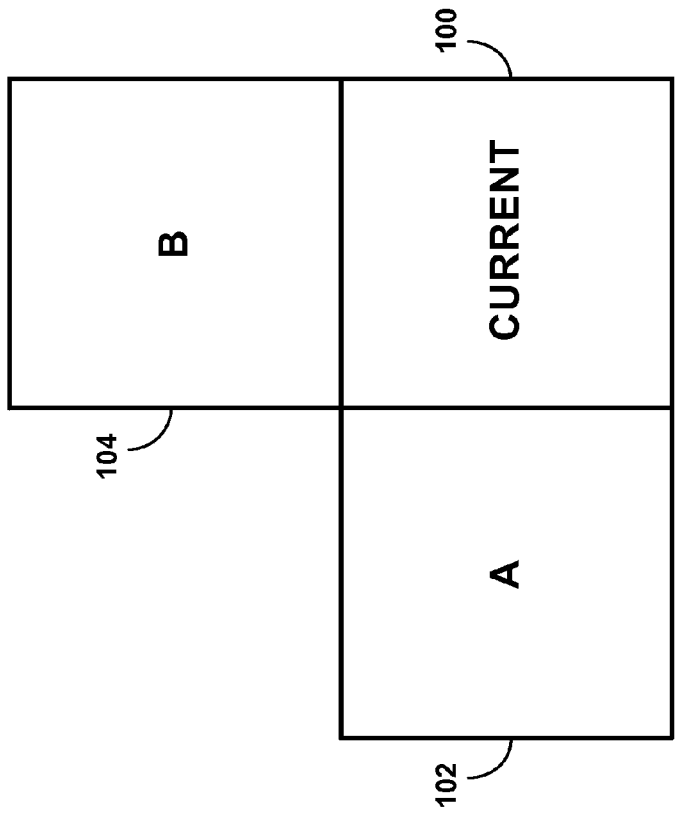
FIG. 4A is a block diagram illustrating a conceptual representation of intra-prediction modes that a video coder may select, in accordance with techniques described in this disclosure.
Figure 4B:
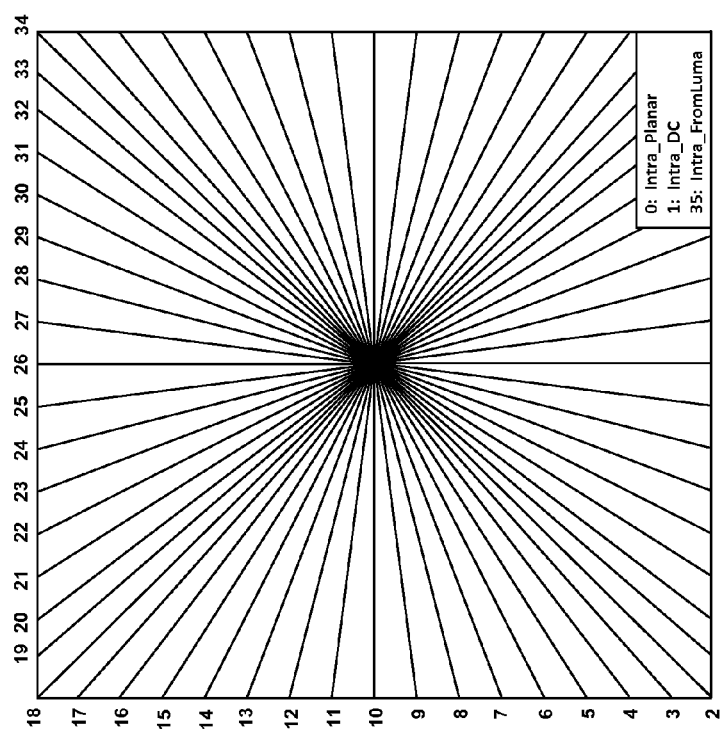
FIG. 4B is a block diagram illustrating a conceptual representation a current block to be intra-predictively coded and neighboring blocks, in accordance with techniques described in this disclosure.
Figure 5:
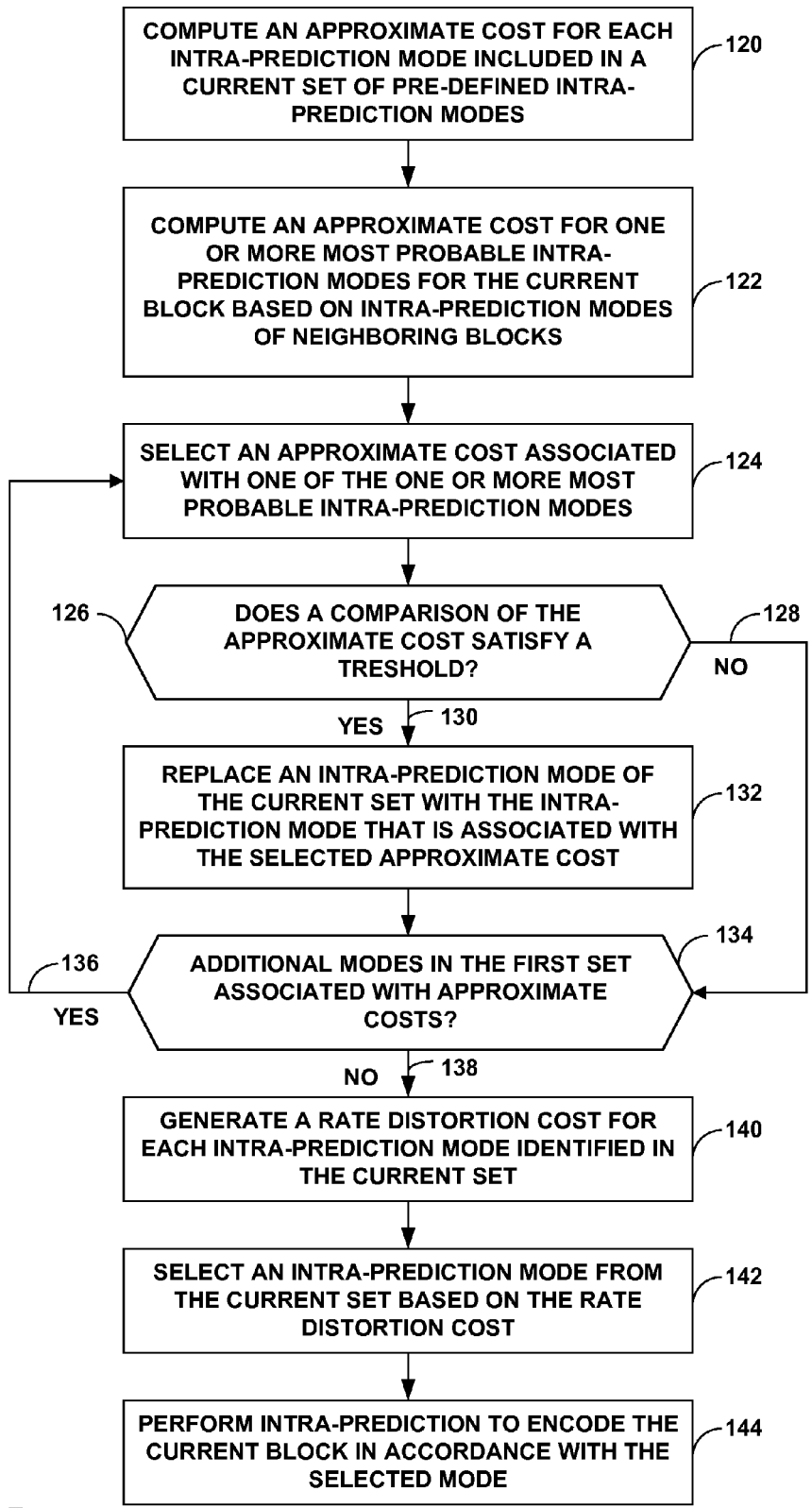
FIG. 5 is a flowchart illustrating exemplary operations of a video coder, such as a video encoder as shown in FIG. 2, that reduce the complexity of mode selection when selecting from multiple, different prediction modes.

To identify most-probable modes included the pre-defined set, mode select unit 43 may identify one or more intra-prediction modes of previously encoded blocks, as further described with respect to FIGS. 4A-4B and 5. The previously encoded blocks may be neighboring blocks that are adjacent to the current block. The intra-prediction modes of these so-called neighboring blocks may have a relatively high probability of being the same or similar to intra-prediction modes that provide low rate distortion for the current block due to a spatial proximity of the neighboring blocks to the current block. Consequently, video encoder 20 may identify these intra-modes of the neighboring blocks as most-probable modes, compute the approximate costs of the most-probable modes, and include the modes in the current set.

Figure 6:
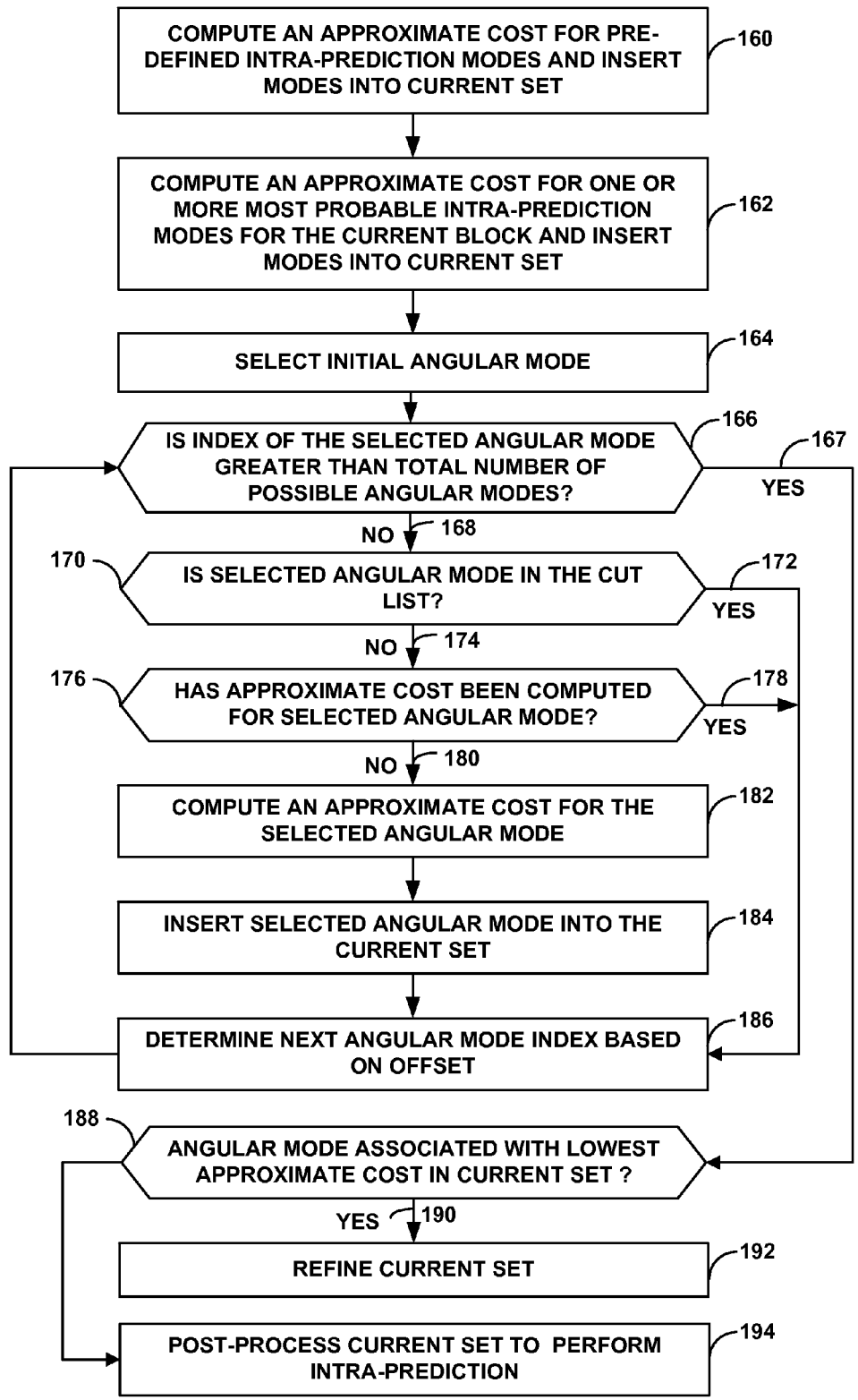
FIG. 6 is a flowchart illustrating exemplary operations of a video coder, such as a video encoder as shown in FIG. 2, to initially construct a current set of intra-prediction modes, in accordance with techniques of the disclosure.

To identify one or more angular modes using a sampling offset, mode select unit 43 may sample one or more angular modes included in a group of all possible angular intra-prediction modes, as further described with respect to FIG. 6 of this disclosure. Mode select unit 43 may not compute approximate costs for all of the angular prediction modes in order to reduce the number of approximate cost calculations. Instead, mode select unit 43 may sample one or more angular modes using an offset. That is, by using an offset to select modes for approximate cost computation, mode select 43 may uniformly sample a subset of the total possible angular prediction modes.

In the sampling process, mode select unit 43 may determine, for a sampled subset of all possible angular modes, whether each respective sampled angular mode is included in a cut list. A cut list may include one or more intra-prediction modes that appear with low or the least probabilities. For instance, the one or more intra-prediction modes may be associated with respective probabilities and/or frequencies that do not satisfy a threshold value (e.g., are less than a threshold value). If a respective sampled angular mode is included in a cut list, mode select unit 43 may not compute an approximate cost for the mode and adding the mode to the current set. Moreover, in some examples, if mode select unit 43 has already computed the approximate cost for a respective sampled angular mode, mode select unit 43 may not compute an approximate cost for the mode. Through this process of sampling one or more angular modes, mode select unit 43 may include one or more sampled angular modes in the pre-defined set of intra-prediction modes.

The current set, in some examples, may have a length N of pre-defined modes in ascending order of approximate cost (e.g., SATD cost). In HM, N is set to 8 for PU size of 4×4 and 8×8, 3 for PU size greater than 8×8. The smaller the value of the variable N, the fewer number of full rate distortion cost calculations that mode select unit 43 may perform. To balance complexity and coding efficiency tradeoffs, mode select unit 43 may set N to be 3 for PU size of 4×4 and 8×8, and may set N to 2 for PU size of 16×16 and 32×32.

Upon initially constructing a current set that includes a pre-defined set of modes and prior to post-processing of the current set as further described below, mode select unit 43 may perform a search to refine the current set. Example techniques to refine the current set are further illustrated in FIG. 8. In one example, mode select unit 43 may select a mode in the pre-defined set of intra-prediction modes that has the lowest relative approximate cost among the approximate costs computed for each mode identified in the predefined set of intra-prediction modes. To illustrate, mode 26 may have the lowest approximate cost in the pre-defined set of intra-prediction modes. Mode select unit 43 may therefore begin the search from mode 26, where the mode value, i.e., 26, is decremented and incremented by some offset F to arrive at 26+F and 26−F. Mode select unit 43 may then compute the approximate costs for each of modes 26+F and 26−F and selects the mode with the lowest approximate costs among the modes 26, 26+F and 26−F. Mode select unit 43 may then replace a mode in the current set based on this comparison, e.g., replacing the mode 26 in the current set with the selected mode that has the lowest approximate costs among the modes 26, 26+F and 26−F.

Mode select unit 43 may repeat the search in this manner, halving F to F/2, re-focusing the search on mode 26 (if neither mode 26+F or mode 26−F had an approximate cost less than mode 26), mode 26+F (if mode 26+F was added to the current set) or mode 26−F (if mode 26−F was added to the current set). In other examples, mode select unit 43 may divide F by any suitable value d, where d is equal to 2 in the current example. Mode select unit 43 may continue the search process until F is divided into a fractional number (assuming F begins as a value that is a power of two). So if F is set to 4, for example, the process iterates once with F=4, once with F=2, once with F=1 and then terminates when F=0.5.

Figure 7A:
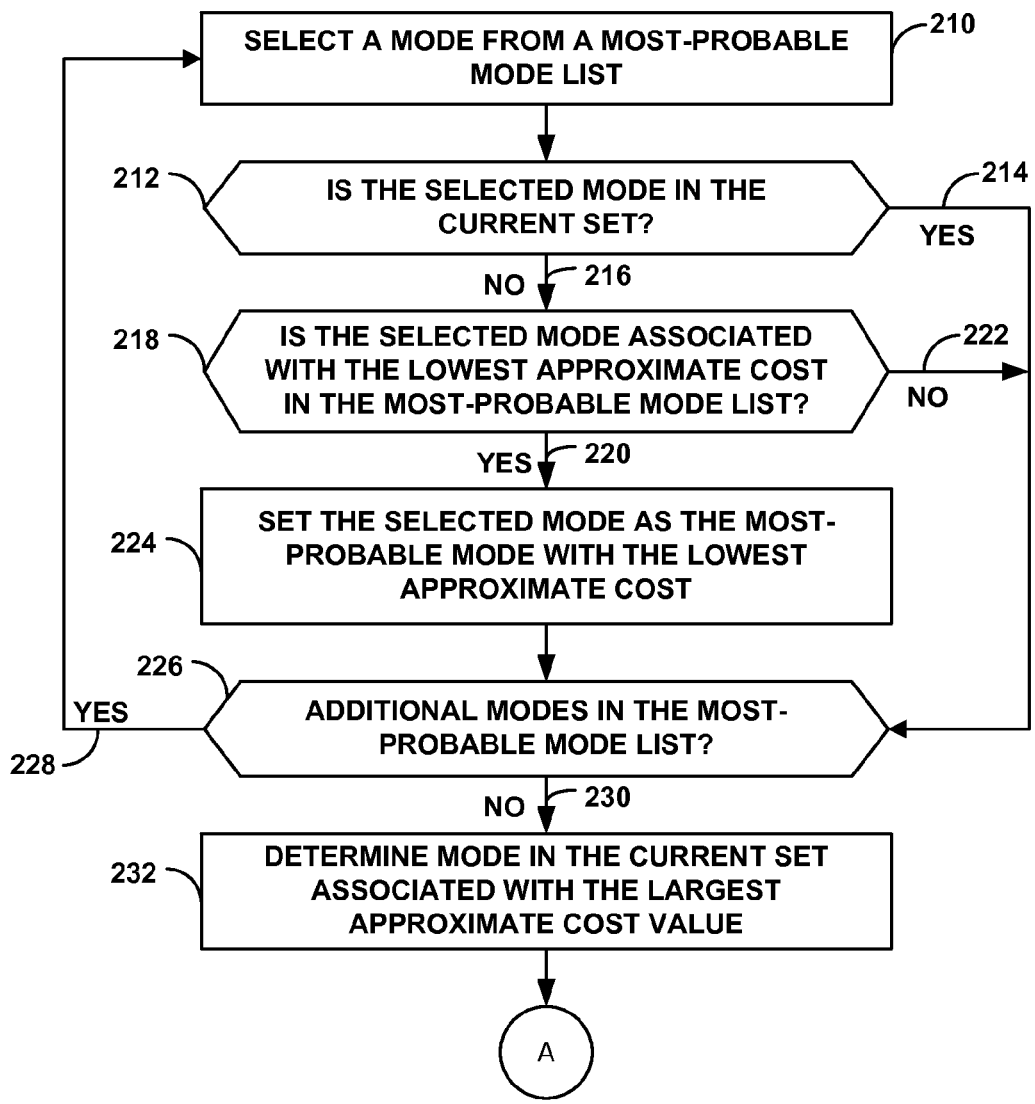
FIG. 7A is a flowchart illustrating exemplary operations of a video coder, such as a video encoder as shown in FIG. 2, to post-process current set of intra-prediction modes.
Figure 7B:
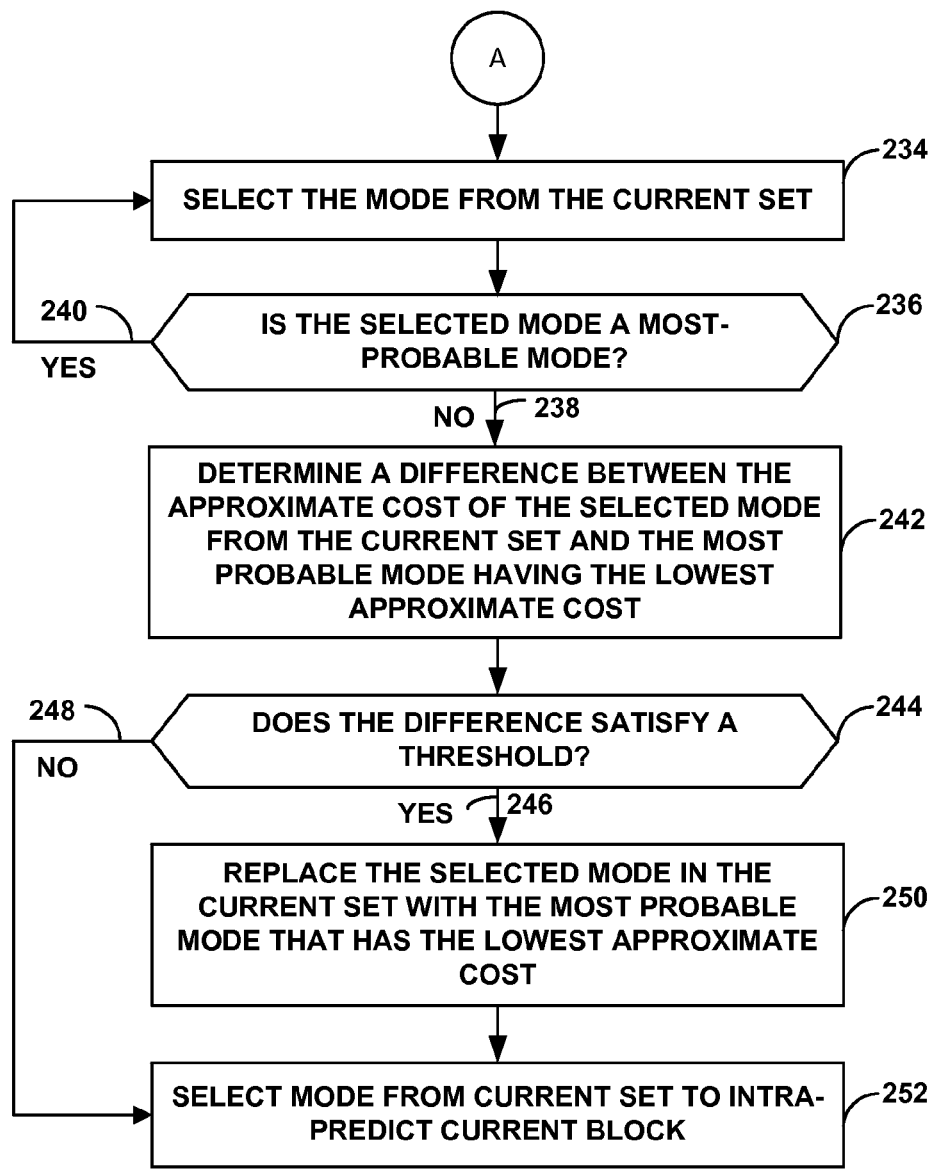
FIG. 7B is a flowchart illustrating exemplary operations of a video coder, such as a video encoder as shown in FIG. 2, to post-process current set of intra-prediction modes.

Upon initially generating the current set that includes pre-defined intra-prediction modes and/or angular intra-prediction modes selected using the refinement process, mode select unit 43 may perform post-processing on the current list, as further illustrated in FIGS. 7A, 7B. While most-probable modes may occur with higher probabilities as the mode to intra-predict blocks, most probable modes may not necessarily have small approximate costs. Therefore, only using most-probable modes in the current set may result in substantial performance losses. Consequently, mode select unit 43 may use both most probable modes and approximate cost to post-process the current set and select a mode to intra-predict the current block. That is, mode select unit 43 may perform post-processing on the current set such that the current set includes modes with both most probable modes and relatively small approximate cost.

To post-process the current set, mode select unit 43 may determine a most-probable mode with the lowest approximate cost from all possible most-probable modes. Mode select unit 43 may compare this most probable intra-prediction mode having the lowest approximate cost to a threshold. In some examples, the threshold comparison may be defined in accordance with the following equation:

$$\left| \frac{J_M - J}{J} \right| < T$$

In the above equation, the variable J may be the approximate cost (e.g., SATD) of a non-most probable intra-prediction mode in the current set, while the variable $J_M$ is the approximate cost of the most probable intra-prediction mode having the lowest approximate cost of all possible most-probable modes. In the above equation, the variable T refers to a threshold, typically having a value between 0 and 1. The equation provides that if the absolute value of the difference between $J_M$ and J divided by J is less than a threshold value T, mode select unit 43 adds the most probable mode in place of the non-most probable mode to which the most probable mode was compared. In this way, mode select unit 43 may replace one or more of the intra-prediction modes identified in the current set of intra-prediction modes with the one or more most probable intra-prediction modes based on the comparisons.

In accordance with the techniques set forth in this description, mode select unit 43 may therefore provide a fast mode decision process for intra prediction. These techniques may reduce the number of approximate cost calculations to less than 17. In some examples, these techniques may reduce the number of full rate distortion cost calculations to 3 (for PU size of 4×4 and 8×8) and 2 (for PU size bigger than 8×8).

Mode select unit 43 may then perform a full rate distortion analysis with respect to each intra-prediction mode identified in the current set of post-processed intra-prediction modes to determine a full rate distortion cost for each intra-prediction mode identified in the current set of intra-prediction modes. Intra-prediction unit 46 may then perform intra-prediction with respect to the current block in accordance with one of the intra-prediction modes identified in the current set of intra-prediction modes based on the determined rate distortion costs to encode the current block. Often, intra-prediction unit 46 performs the mode having the lowest rate distortion cost.

As described above, in some examples, mode select unit 43 may determine whether or not to perform the refinement search for additional intra-prediction modes. As one example, the initially constructed current set prior to the refinement search may include modes 0, 1, and angular mode 26. Mode select unit 43 may determine whether or not to perform the refinement search based on whether the approximate cost computed for mode 26 is the lowest approximate cost relative to the approximate costs computed for mode 0 and mode 1. That is, mode select unit 43 may determine whether the lowest approximate cost in the current set is associated with an angular mode, in contrast to, for example, planar mode or a most-probable mode. In this respect, if the lowest approximate cost is associated with an angular mode in the current set, mode select unit 43 may search for additional intra-prediction modes based on the computed approximate costs for the intra-prediction modes identified in the current set of intra-prediction modes. In contrast, if mode 0, 1 and 26 are all in the current set and mode 26 is not associated with the lowest approximate cost relative to the approximate costs computed for mode 0 and mode 1, then mode select unit 43 may not perform the refinement search on the current set. Thus, in some instances, mode select unit 43 may perform the refinement search described above when the mode associated with the lowest approximate cost is an angular mode.

In some examples, upon post-processing the current set, intra-prediction unit 46 may perform intra-prediction to encode the current block in accordance with one of the intra-prediction modes identified by the post-processed current set of intra-prediction modes. Using a selected mode, intra-prediction unit 46 may determine a predictive block to encode the current block. For instance, the prediction mode may indicate which block or group of blocks intra-prediction mode will evaluate to select the predictive block.

After intra-prediction unit 46 determines the predictive block for the current video block, summer 50 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may also entropy encode the motion vectors and the other syntax elements for the current video slice being coded. Following the entropy encoding by entropy encoding unit 56, the encoded bitstream may be transmitted to video decoder 30, or archived for later transmission or retrieval by video decoder 30.

Entropy coding unit 56 may encode the information indicating the selected intra-prediction mode in accordance with the techniques of this disclosure. Video encoder 20 may include in the transmitted bitstream configuration data, one or more intra-prediction mode index tables and a plurality of modified intra-prediction mode index tables (also referred to as codeword mapping tables), definitions of encoding contexts for various blocks, encoded video data, etc. These types of information that video encoder 20 may include in the transmitted bitstream are exemplary, and many other types of information may also be included in the bitstream.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
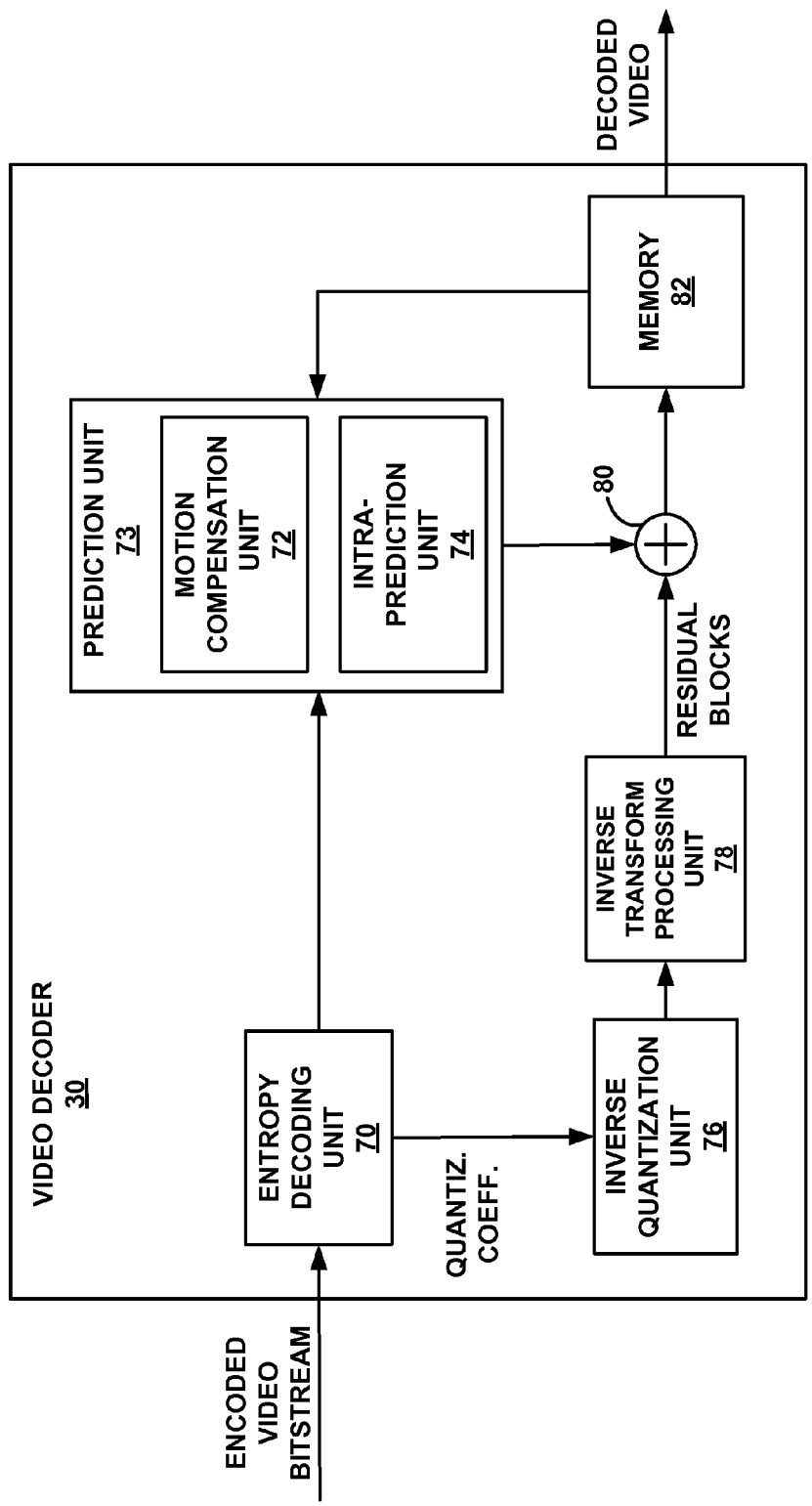
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 70, prediction unit 73, inverse quantization unit 76, inverse transform processing unit 78, summer 80, and reference picture memory 82. Prediction unit 73 includes motion compensation unit 72 and intra-prediction unit 74. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. The encoded bitstream may include, among other information, prediction modes that correspond to blocks and which were selected by mode select unit 43 as previously described with respect to FIG. 2, in accordance with techniques of the disclosure. Entropy decoding unit 70 of video decoder 30 may entropy decode the bitstream to generate quantized coefficients, motion vectors, and other syntax elements. Entropy decoding unit 70 may forward the motion vectors and other syntax elements to prediction unit 73. Video decoder 30 may receive the syntax elements at the video slice level and/or the video block level.

When the video slice is coded as an intra-coded (I) slice, intra prediction unit 74 of prediction unit 73 may generate prediction data for a video block of the current video slice based on a signaled intra prediction mode and data from previously decoded blocks of the current frame or picture. Intra-prediction unit 74 may determine the appropriate intra-prediction mode for decoding the current block of video data based on an index corresponds to the intra-prediction mode for the current block. The intra-prediction mode may have been previously selected by mode select unit 43 as previously described with respect to FIG. 2, and the index may have been included in the encoded bitstream sent by video encoder 20 to video decoder 30. Intra-prediction unit 74 may select a predictive block based on the intra-prediction mode corresponding to the index. Summer 80 may add the predictive block data and residual block data from inverse transform processing unit 78 to generate the decoded current block. Memory 82 may store the decoded current block, which may be subsequently outputted by a display device or sent to another computing device.

As noted above, aspects of this disclosure generally relate to intra-coding. As such, certain techniques of this disclosure may be performed by intra-prediction unit 74. That is, for example, intra-prediction unit 74 may perform the techniques of this disclosure described with respect to FIGS. 4A-8 below. In other examples, one or more other units of video decoder 30 may additionally or alternatively be responsible for performing the techniques of this disclosure.

When the video picture is coded as an inter-coded (e.g., B, P or GPB) slice, motion compensation unit 72 of prediction unit 73 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

FIG. 4A is a block diagram illustrating a conceptual representation of intra-prediction modes that a video coder may select, in accordance with techniques described in this disclosure. Video coding standards such as H.264/AVC, MPEG-2, and HEVC use block-based hybrid video coding frameworks. In such frameworks, a picture is divided into blocks of different sizes, which in HEVC is called a CU (coding unit). As previously described, each CU may be split into smaller blocks for prediction (PU) or transform (TU). Each PU may be predicted either within the current slice in the case of intra mode or from the temporally neighboring slices in the case of inter mode. The prediction error is transformed, quantized and coded using variable length coding techniques, as described in FIGS. 1-3.

In video data there may exist a relatively high correlation between samples in a rectangle area and the samples that are immediately adjacent to that area. In some examples, video coding techniques such as HEVC use intra prediction to predict the current PU from samples in adjacent, previously coded PUs. In HEVC, intra prediction provides 35 modes for different PUs. The 35 modes include planar mode (mode 0), DC mode (mode 1) and 33 angular prediction modes which correspond to 33 prediction direction of angles +/−[0, 2, 5, 9, 13, 17, 21, 26, 32]/32.

FIG. 4A illustrates the 35 angular prediction directions for all the modes defined in HEVC. In planar mode (denoted as "mode 0" or "0"), video encoder 20 may predict pixel values for the current block from the pixel values in the column adjacent to the left column of the current block and the pixel values in the row adjacent to the up row of the current block. In DC mode (denoted as "mode 1" or "1"), video encoder 20 may compute a predictive block from the mean of the sum of the values of the pixels in the row above the top row of the current block and the values of the pixels in the column adjacent to the left most column of the current block. In the angular prediction mode, video encoder 20 may predict pixels along a given angle (which is shown above as intra-prediction modes 2-34) typically from the pixel values from either the row above the top row of the current block or the pixel values of the column adjacent to the left-most column of the current block.

When performing intra-prediction, the video encoder may select from among multiple, different intra-prediction modes. When performing intra-prediction, the video encoder often analyzes an approximate cost associated with each of the 35 intra-prediction modes. This approximate cost may approximate a rate-distortion cost. Computing a rate-distortion cost typically requires that the video encoder compute a predicted block using each of the intra-prediction modes, determine a difference between each of the predicted blocks and the current block (which is commonly referred to as a "residual block" that specifies the residual pixel values referenced above), transform each of the residual block from the spatial domain to the frequency domain, quantize each of the transformed residual blocks to generate corresponding encoded video block, and then decode the encoded video block, comparing each of the decoded video block to the current block to determine a distortion metric. Moreover, this rate-distortion analysis involves computing, for each of the intra-prediction modes, the amount of bits used to signal each of the encoded video blocks. Therefore, the video encoder may compute an approximate cost rather than perform this rate-distortion analysis for each of the predicted blocks predicted using a corresponding one of the 35 intra-prediction modes.

In some examples, the video encoder may compute an approximate cost for each of the predicted blocks predicted using each of the intra-prediction modes. For instance, the video encoder may initially compute 35 approximate costs corresponding to each of the 35 intra-prediction modes. The video encoder may then perform full rate distortion analysis for some subset of the intra-prediction modes as the approximate cost may incorrectly approximate a rate distortion cost under certain circumstances.

Although the above simplification using a subset may reduce the amount of computations required compared with brute force searching, such techniques overall still require 35 calculations of the approximated costs corresponding to each of the 35 intra-prediction modes. While such techniques may reduce the number of times the video encoder performs the computationally-intensive rate distortion analysis, this process may not be well suited for real-time encoding or near-real-time encoding of video data given the complexity and time required to compute the approximate costs for each of the 35 modes. In some real-time video encoding environments, the processing requirements to compute approximate costs for all possible modes may exceed design constraints.

In accordance with the techniques described in this disclosure, video encoder 20 may further reduce the number of modes to which the rate distortion analysis is performed, thereby potentially reducing time and complexity associated with performing an intra-prediction process. For instance, video encoder 20 may initially determine a subset of pre-defined prediction modes that are statistically more likely to be used when performing intra-prediction. Video encoder 20 may then refine the subset by searching for additional intra-prediction modes that provide lower rate distortion approximate cost. For instance, video encoder 20 may identify an intra-prediction mode in the search that provides lower rate distortion approximate cost.

Based on an approximate distortion cost associated with the identified intra-prediction mode, video encoder 20 may add the identified mode to the subset and/or replace a pre-defined mode in the subset with the identified mode. In this way, video encoder 20 may refine the subset of prediction modes to include modes that provide lower rate distortion approximate cost. Consequently, video encoder 20 may perform full rate distortion analysis only for those intra-prediction modes identified in the subset of intra-prediction modes rather than all possible intra-prediction modes. Since the number of intra-prediction modes in the current set may be less than the total number of intra-prediction modes and provide lower rate distortion approximate cost, techniques of the disclosure may reduce the complexity and processing requirements to perform mode selection. In some examples, reducing such processing requirements may improve video coding performance in parallel- and/or serial-processing video coders. By reducing the time and complexity associated with performing the intra-prediction process, video encoder 20 may perform real-time video encoding or near-real-time video encoding.

FIG. 4B is a block diagram illustrating a conceptual representation a current block to be intra-predictively coded and neighboring blocks, in accordance with techniques described in this disclosure. FIG. 4B illustrates an example of a current block 100, which may be referred to as a current coding unit ("current CU") and two neighboring blocks, block 102 ("block A") and block 104 ("block B"), that may be considered during intra-coding. For example, a video encoder may consider the intra-prediction modes used to code neighboring block 102 (positioned to the left of the current block) and neighboring block 104 (positioned above the current block) as the most probable intra-modes of the current block.

As previously described in FIGS. 2 and 4A, a video encoder may compute an approximate cost that may approximate a rate-distortion cost, rather than computing full rate-distortion costs. Instead of computing the approximate cost for each of the possible intra-prediction modes, a video encoder may identify one or more so called "most probable" intra-prediction modes during intra-prediction coding. To identify a most probable mode, a video encoder may identify an intra-prediction mode of previously encoded blocks (which are often neighboring blocks that are adjacent to the current block). The intra-modes of these so-called neighboring blocks may have a relatively high probability of being the same or similar to the current block due to a spatial proximity of the neighboring blocks to the current block. A video encoder may reduce the number of approximate cost calculations to only these most probable modes or these most probable modes and other likely modes (such as the planar and DC modes) that are statistically more likely to be used when performing intra-prediction than other modes.

A video encoder may form a list of a size identified above (8 to 10 for blocks of a size 8×8 or less and 3 to 5 for blocks of a size greater than 8×8), ordering the intra-prediction modes having the lowest approximate cost in the list by their respective costs. That is, the lowest cost mode may be positioned first in the list followed by the second lowest cost mode, etc. The video encoder may then identify the most probable modes based on the intra-prediction modes used to encode the neighboring blocks and add these modes to the list, either appending these modes to the list. In some instances, these most probable modes may already be present in the list, whereupon the video encoder does not re-add this most probable mode to the list. The video encoder may then perform the full rate distortion analysis with respect to the modes in the list, thereby reducing the number of predicted blocks for which the video encoder performs the full rate distortion analysis.

While this process may reduce the number of times the video encoder performs the computationally-intensive rate distortion analysis, this process still may not be well suited for real-time encoding or near-real-time encoding of video data given the complexity and time required to perform approximate cost calculations for each of the 35 modes. In accordance with the techniques described in this disclosure, a parallel video encoder, such as video encoder 20 in some examples, (meaning a video encoder that encodes neighboring block 102 and 104 concurrently with encoding current block 100) may only calculate approximate costs for a subset of the total 35 intra-prediction modes illustrated in FIG. 4A, which may thereby reduce complexity of mode selection and provide for cost savings in terms of production of video encoder 20.

In operation, video encoder 20 may compute an approximate cost for each intra-prediction mode identified in a pre-defined set of intra-prediction modes that includes at least one intra-prediction mode but less than a total number of intra-prediction modes available for coding a current block of the video data. Often, this pre-defined set includes those modes that have been observed to be statistically more likely to be used when performing intra-prediction. In some instances, this pre-defined set may be fixed. This pre-defined set may, at this point, comprise a current set of intra-prediction modes for the current block. In some instances, the predefined set can be formed by planar mode, mode probable modes and angular modes sampled with a sampling offset.

Video encoder 20 may then search for additional intra-prediction modes (e.g., as shown in FIG. 4A), adding the additional intra-prediction modes to the current set of intra-prediction modes. In some examples, this search may resemble a binary search, wherein video encoder 20 starts from the mode in the pre-defined set of intra-prediction modes that has the lowest relative computed approximate cost among the approximate costs computed for each mode identified in the predefined set of intra-prediction modes.

To illustrate, mode 26 may have the lowest approximate cost. Under this assumption, video encoder 20 may begin the search from mode 26, where the mode value, i.e., 26, is decremented and incremented by some offset F to arrive at 26+F and 26−F. Video encoder 20 may then compute the approximate costs for each of modes 26+F and 26−F and selects the mode with the lowest approximate costs among the modes 26, 26+F and 26−F. Video encoder 20 may then replace a mode in the current set based on this comparison, e.g., replacing the mode 26 in the current set with the selected mode that has the lowest approximate costs among the modes 26, 26+F and 26−F.

Video encoder 20 then repeats the search in this manner, halving F to F/2, re-focusing the search on mode 26 (if neither mode 26+F or mode 26−F had an approximate cost less than mode 26), mode 26+F (if mode 26+F was added to the current set) or mode 26−F (if mode 26−F was added to the current set). Video encoder 20 continues the search process until F is divided into a fractional number (assuming F begins as a value that is a power of two).

In this manner, video encoder 20 may search for additional intra-prediction modes based on the computed approximate costs for the intra-prediction modes identified in the current set of intra-prediction modes and compute approximate costs for each of the additional intra-prediction modes. Video encoder 20 may add the additional intra-prediction modes to the current set of intra-prediction modes based on a comparison of the approximate costs computed for each of the intra-prediction modes identified in the current set of intra-prediction modes and the approximate costs computed for the additional intra-prediction modes.

FIG. 5 is a flowchart illustrating exemplary operations of a video coder, such as video encoder 20 shown in FIG. 2, that reduce the complexity of mode selection when selecting from multiple, different prediction modes. Specifically, video encoder 20 may construct an initial candidate set that includes pre-defined modes, and post-process the current set. Although not shown in FIG. 5, video encoder 20 may, in some examples, refine the current set to further identify modes with low approximate costs, as further illustrated in FIG. 8. In performing these techniques of the disclosure, video encoder 20 may reduce the number of modes in the current set. Video encoder 20 may use the post-processed candidate list in a rate-distortion optimization process and select a best mode (e.g., lowest rate distortion) to intra-predict a current block.

Initially, video encoder 20 may compute an approximate cost for each intra-prediction mode identified in a current set of intra-prediction modes that includes a pre-defined set of intra-prediction modes having at least one intra-prediction mode (120). The current set of intra-prediction modes may include less intra-prediction modes than a total number of intra-prediction modes available for coding a current block of the video data. The pre-defined set of intra-prediction modes may include those modes that have been observed to be statistically more likely to be used when performing intra-prediction. That is, in some examples, video encoder 20 may determine one or more statistics that indicate the number of occurrences that one or more modes are selected, and based at least in part on the statistics, video encoder 20 may select the modes included in the first set of intra-prediction modes.

As previously described in FIG. 2, the predefined set can be formed by planar mode, mode probable modes and angular modes sampled with a sampling offset. Since the planar mode and the most probable modes may appear often as the final selected mode, video encoder 20 may determine approximate costs of these respective modes in the current set as further described below.

To identify most-probable modes included the pre-defined set, video encoder 20 may identify one or more intra-prediction modes of previously encoded blocks. The previous encoded blocks may be neighboring blocks that are adjacent to the current block as illustrated in FIG. 4B. The most probable modes may have a relatively high probability of being the same or similar to the current block due to a spatial proximity of the neighboring blocks to the current block. Consequently, video encoder 20 may identify the most-probable modes, compute the approximate costs of the most-probable modes, and include the respective modes in the current set (122).

To identify one or more angular modes using a sampling offset, video encoder 20 may sample one or more angular modes included in the group of all possible angular intra-prediction modes, as further described with respect to FIG. 6. Video encoder 20 may not compute approximate costs for all of the angular prediction modes in order to reduce the number of approximate cost calculations. Instead, video encoder 20 may sample one or more angular modes using an offset. In some examples, by using an offset to select modes to for approximate computation, video encoder 20 may uniformly sample a subset of the total possible angular prediction modes. Using a cut list as described in FIGS. 2 and 6, video encoder 20 may excludes one or more sampled angular modes from the current set.

Upon initially generating the current set that includes pre-defined intra-prediction modes and/or angular intra-prediction modes, video encoder 20 may perform post-processing on the current list (further illustrated in FIGS. 7A, 7B). While most-probable modes may occur with higher probabilities as the mode to intra-predict blocks, most probable modes may not necessarily have small approximate costs.

To post-process the current set, video encoder 20 may determine a most-probable mode with the lowest approximate cost from all possible most-probable modes. For instance, video encoder 20 may select a mode associated with a lowest approximate cost from a group of all possible the most probable mode (124). Mode select unit 43 may compare this most probable intra-prediction mode having the lowest approximate cost to a threshold.

Video encoder 20 may determine whether the comparison satisfies a threshold (126). For instance, if video encoder 20 determines that the difference between the approximate cost of the most probable intra-prediction mode having the lowest approximate cost and the approximate cost of a non-most probable intra-prediction mode in the current set is less than a threshold value (130), video encoder 20 may add the most probable mode in place of the non-most probable mode to which the most probable mode was compared (132). In some examples, video encoder 20 may further divide the difference by the approximate cost of the non-most probable mode when performing the comparison. In other examples, if video encoder 20 determines that the comparison of the approximate cost does not satisfy a threshold (128), video encoder 20 may determine whether to select another most-probable mode.

Video encoder 20 may determine whether to select another most-probable mode of all possible most probable modes (124). For instance, if video encoder 20 determines another most probable mode not yet evaluated by video encoder 20 exists (e.g., a most-probable mode with the next lowest approximate cost), video encoder 20 may select the approximate cost associated with that newly selected most probable mode (124) and repeat one or more of operations (124)-(134). Alternatively, if no unchecked most-probable modes exist and/or video encoder 20 does not select another most-probable mode (138), video encoder 20 may generate a full rate distortion cost for each intra-prediction mode identified in the current set (140).

Upon generating the full rate distortion costs for the respective intra-prediction modes of the current set, video encoder 20 may selected an intra-prediction mode from the current set based on the full rate distortion costs (142). In an alternative example, video encoder 20 may not perform full rate distortion analysis one or more modes of the current set and select an intra-prediction mode from the current set based on an approximate cost. In any case, video encoder 20 may select, for example, an intra-prediction mode. In other examples, video encoder 20 may select an intra-prediction mode that is not associated with the lowest-approximate cost.

Upon selecting an intra-prediction mode, video encoder 20 may perform intra-prediction to encode the current block using the selected mode (144). In this way, the techniques set forth in this description may provide a fast mode decision process for intra prediction. These techniques may, in some instances, reduce the number of approximate cost calculations to less than 17. In some examples, these techniques may reduce the number of full rate distortion cost calculations to 3 (for PU size of 4×4 and 8×8) and 2 (for PU size bigger than 8×8).

FIG. 6 is a flowchart illustrating exemplary operations of a video coder, such as video encoder 20 shown in FIG. 2, to initially construct a current set of intra-prediction modes, in accordance with techniques of the disclosure. Specifically, in FIG. 6, video encoder 20 may construct the initial current set that includes one or more pre-defined modes and/or angular modes.

Initially, video encoder 20 may determine one or more pre-defined intra-prediction modes and compute an approximate cost for each mode (160). Examples of such pre-defined intra-prediction modes may include mode 0 (the planar mode) and mode 1 since these modes appear often in the final selected intra-prediction mode. Video encoder 20 may determine the approximate costs of the modes and insert the modes into the current set, which may have a length N. In some examples, video encoder 20 inserts the modes into the current set in ascending order of approximate cost. In HM, N is set to 8 for PU size of 4×4 and 8×8, 3 for PU size greater than 8×8. The smaller the number N is, the fewer number of rate distortion cost calculations that video encoder 20 may perform. To obtain an improved tradeoff of complexity and coding efficiency, video encoder 20 may set N to be 3 for PU size of 4×4 and 8×8, 2 for PU size of 16×16 and 32×32.

Video encoder 20 may next determine one or more most-probable modes and compute an approximate cost for each mode (162). To identify most probable modes, video encoder 20 may identify an intra-prediction mode of previously encoded blocks. The previous encoded blocks may be neighboring blocks that are adjacent to the current block. In some instances, there are three most probable modes. The first two are the intra prediction modes of the above and left PUs if those PUs are available and are coded using an intra prediction mode. Any unavailable prediction mode is considered to be intra DC mode. When the two most probable modes are not equal, the third most probable mode is set equal to Intra_Planar, Intra_DC or Intra_Angular[26] (vertical), according to which of these modes, in this order, is not a duplicate of one the first two modes. When the first two most probable modes are the same, if this first mode has the value Intra_Planar or Intra_DC, the second and third most probable modes are assigned as Intra_Planar, Intra_DC, or Intra_Angular[26], according to which of these modes, in this order, are not duplicates. When the first two most probable modes are the same and the first mode has an Intra_Angular value, the second and third most probable modes are chosen as the two angular prediction modes that are closest to the angle (i.e. the value of k) of the first.

The most probable modes may have a relatively high probability of being the same or similar to the current block due to a spatial proximity of the neighboring blocks to the current block. Consequently, video encoder 20 may determine the approximate costs of the most-probable modes and insert the modes into the current set. In some examples, video encoder 20 inserts the modes into the current set in ascending order of approximate cost.

Video encoder 20 may also add one or more angular intra-prediction modes to the current set. To reduce the number of approximate cost calculations, video encoder 20 may not compute approximate costs for each possible angular intra-prediction mode. Instead, video encoder 20 may uniformly sample the angular intra-prediction modes with an offset. In some examples, video encoder 20 may also not compute approximate costs for one or more intra-prediction modes included in a cut list that is further described below.

To sample one or more angular modes, video encoder 20 may select an initial angular mode (164). In some examples, the initial angular mode may be an angular mode with a mode index of 2. In other examples, video encoder 20 may determine the initial angular based on the offset. For instance, video encoder 20 may select as the initial mode the mode having an index equal to the offset or a value that is based at least in part on the offset.

Video encoder 20 may next determine whether the index of the selected angular mode is greater than the total number of possible angular modes (166). For instance, the total number of angular modes may be equal to 33 and video encoder 20 may determine whether the selected angular mode (e.g., intra-prediction mode 2) is less than 33. Upon determining that the index of the selected angular mode is less than the total number of possible angular modes (168), video encoder 20 may determine whether the selected angular mode is in a cut list. A cut list cut list may include intra-prediction modes that are selected with low or the least probabilities. In some examples, video encoder 20 may determine a cut list based on the collected statistics. For example, video encoder 20 may determine redundancies in the 33 angular modes. As one example, video encoder 20 can use mode 2 and mode 34 to predict the same edge direction in an image. Since video encoder 20 may check mode 2 first when video encoder 20 selects the angular modes in ascending order, video encoder 20 is unlikely to insert mode 34 into the current set. In some examples, mode 34 may occur with very low probabilities.

In some examples, video encoder 20 can obtain the cut list by determining the number of modes selected by full rate distortion optimization. In this way, video encoder 20 can derive a distribution of the intra-prediction modes. For instance, the probabilities of intra-prediction modes selected by video encoder 20 may be dependent on one or more most-probable modes, that is, the intra prediction modes of the previously coded neighboring PUs, such as the PUs left and above of the current PU.

As one example of cut lists that are based on one or more most-probable modes, video encoder may use a value of 4 as the offset. For 32×32 PUs, the cut list selected by video encoder 20 may be dependent on the prediction mode of the left PU, and a cut list table that includes multiple cut lists may be defined as:
UInt Modes2Cut[35][6]={{34, 14, 18, 22, 2, 30}, {34, 14, 18, 30, 22, 2}, {14, 22, 18, 34, 30, 10}, {18, 22, 14, 30, 34, 2}, {22, 14, 18, 34, 30, 2}, {22, 18, 14, 30, 34, 2}, {22, 34, 18, 30, 14, 2}, {22, 34, 18, 14, 30, 2}, {22, 18, 34, 30, 14, 2}, {22, 18, 34, 2, 14, 30}, {34, 18, 22, 2, 14, 30}, {18, 22, 34, 2, 30, 14}, {22, 34, 2, 18, 30, 14}, {34, 22, 2, 18, 30, 6}, {34, 30, 2, 18, 22, 6}, {34, 2, 22, 30, 10, 18}, {34, 2, 22, 30, 10, 14}, {34, 2, 22, 30, 14, 10}, {34, 30, 2, 14, 22, 10}, {34, 14, 2, 30, 10, 22}, {14, 34, 30, 2, 10, 6}, {14, 34, 30, 2, 10, 18}, {34, 14, 18, 2, 10, 30}, {14, 34, 18, 2, 10, 30}, {14, 18, 34, 2, 6, 30}, {34, 14, 18, 2, 30, 22}, {34, 18, 14, 22, 2, 30}, {14, 34, 18, 2, 22, 30}, {14, 34, 18, 22, 2, 6}, {14, 18, 34, 22, 2, 6}, {18, 14, 22, 34, 6, 2}, {14, 18, 22, 34, 6, 10}, {14, 18, 22, 34, 6, 10}, {22, 14, 18, 10, 6, 30}, {22, 14, 18, 30, 10, 6}}.

Consequently, if the intra-prediction mode of the left neighboring PU is 2, then the cut list selected by video encoder 20 is {14, 22, 18, 34, 30, 10}. In the above table, modes {34, 14, 18, 22} appear the most number of the times. Consequently, in some examples, a cut list independent of the neighboring block may be {34, 14, 18, 22}.

In some examples, video encoder 20 may construct a cut list based on the prediction modes of neighboring PUs and most-probable modes. For example if the prediction modes of the left neighboring PUs and the above neighboring PUs are the same, video encoder 20 may determine those modes are associated with high probabilities, while modes that are orthogonal to (e.g., 90 degree angles) the high probability modes are less likely to be selected. Therefore, video encoder 20 may construct a cut list that includes the modes that are less likely to be selected based on the modes of the neighboring blocks.

Video encoder 20 may also determine, in some examples, that the difference between the indices of the less likely modes and the indices of the neighboring modes or most probable modes is approximately a value between or equal to 11 to 13. Video encoder 20 may include in the cut list those modes whose mode index is different from a most-probable mode index by a value approximately between or equal to 11 to 13. Consequently, if video encoder 20 determines that two neighboring modes are close but not equal, then video encoder 20 may include in the cut list those modes that are on both sides, numerically, of the modes with a difference more than V. In some examples, V may be equal to a value between 8 and 12 (e.g., 10). Alternatively, if video encoder 20 determines that the two neighboring modes are far apart (e.g., a large difference between the mode indices of the two modes), video encoder 20 may include in the cut list one or more modes at the midpoint of and/or in at mode having a mode index between the respective mode indices of the two neighboring modes.

In the example of FIG. 5, video encoder 20 may determine whether the selected angular mode is in a cut list (170). If the selected angular mode is in the cut list (172), video encoder 20 may not determine the approximate cost of the mode and insert the selected angular mode into the current set. Video encoder 20 may then determine the next angular index based on the offset selected by video encoder 20. For instance, video encoder 20 may increment the index of the selected angular mode by the offset in one example. In another example, video encoder 20 may apply a function to the index of the selected angular using the offset to determine the next angular mode index.

If video encoder 20 determines that the selected angular mode is not in the cut list (174), video encoder may next determine whether an approximate cost has previously been computed for the selected angular mode (176). If the approximate cost has been previously computed for the selected angular mode (178), video encoder 20 may then determine the next angular mode index based on the offset selected by video encoder 20, as described above. If, however, the approximate cost has not been computed for the selected angular mode (180), video encoder 20 may compute the approximate cost for the selected mode (182). Video encoder 20 may next insert the angular mode into the current set (184). In some examples, video encoder 20 then determine the next angular index based on the offset selected by video encoder 20, as described above. As illustrated in FIG. 6, video encoder 20 may only calculate the approximate cost of an angular mode if the mode is not in the cut list and not already checked. Consequently, the number of approximate cost calculations $N_1$ may be:

$$N_1(SATD) = 1(\text{planar}) + 3(MPMs) + \left\lceil \frac{33}{\text{offset}} \right\rceil - K$$

where offset is the sampling offset for the angular modes and K is the length of the cut list.

In some examples, if the next generated angular mode index is greater than the total number of possible angular modes (167), video encoder 20 may determine whether the lowest approximate cost in the current set is associated with an angular mode (188). If the lowest approximate cost in the current set is associated with an angular mode (190), video encoder 20 may further refine the intra-prediction modes in the current set. Further details of the refinement operations are described in FIG. 8. Alternatively, if video encoder 20 determines that the lowest approximate cost in the current set is not associated with an angular mode (e.g., the lowest approximate cost is associated with one of the pre-defined modes, such as planar or DC mode, included in current set), video encoder 20 may post-process the current set as further described in FIGS. 7A and 7B (194) without further refining the current set.

FIG. 7A is a flowchart illustrating exemplary operations of a video coder, such as video encoder 20 shown in FIG. 2, to postprocess a current set of intra-prediction modes. Specifically, in FIG. 5, video encoder 20 may perform post-processing of set (e.g., a current set) of intra-prediction modes previously generated by video encoder 20.

In some examples, video encoder 20 may identify most-probable modes that are selected with high probabilities and/or number of occurrences. Since an approximate cost is just an approximate of the full rate distortion cost, most-probable modes may not have small approximate costs. On the other hand, using only most-probable modes as the candidate modes to perform full rate distortion analysis may result in reduced performance in some examples. Therefore, techniques of the disclosure implemented by video encoder 20 may employ both most-probable modes and approximate costs when selecting one or more intra-prediction modes as further illustrated in FIGS. 7A and 7B. That is, in some examples, the current set of intra-prediction modes may include most-probable modes and modes that have small approximate costs. FIGS. 7A and 7B illustrate post-processing of a current set based on approximate cost and most-probable modes. In some examples, the current set may be a current set of intra-prediction modes that is generated in accordance with the techniques illustrated in FIG. 6. In some examples, the current set may be a current set of intra-prediction modes that is refined in accordance with the techniques illustrated in FIG. 8.

As previously described in the example of FIG. 6, video encoder 20 may determine whether one or more most probable modes not included in the current list have lower approximate cost values than one or more modes in the current set. If video encoder 20 determines that a difference in approximate cost between a most-probable mode not included in the current set and a non-most probable mode in the current set is less than a threshold value, video encoder 20 may include the most-probable mode in the current set, e.g., by replacing the non-most probable mode.

Initially, video encoder 20 may determine a most-probable mode that has the lowest approximate cost from all possible most probable modes. For instance, video encoder 20 may initially select a mode from a most-probable mode list (210). The first most probable mode selected by video encoder 20 may be the most-probable mode associated with the most-probable mode index. Upon selecting the most-probable mode, video encoder 20 may determine whether the selected most-probable mode is in the current set (212) (e.g., the current set generated using techniques illustrated in FIG. 6 and/or FIG. 8).

If video encoder 20 determines that the selected most-probable mode is included in the current set (214), video encoder 20 may determine if any additional most-probable modes in the group of all possible most probable modes have not yet been evaluated (226). If additional most-probable modes remain to be evaluated (228), video encoder 20 may select the next unevaluated most-probable mode included in the group of all possible most probable modes (210).

If video encoder 20 determines that the selected most-probable mode is not included in the current set (216), video encoder 20 may determine the approximate cost associated with the selected most-probable mode. Video encoder 20 may determine whether the approximate cost associated with the selected most-probable mode is the lowest approximate cost of most-probable modes previously checked by video encoder 20 (218). That is, video encoder 20 may retain the index of the mode with the lowest approximate cost (and the corresponding approximate cost of the mode, in some examples) while performing the operations of FIG. 7A. If video encoder 20 determines that the approximate cost associated with the selected most-probable mode is not lower than the approximate cost of any previously checked most-probable mode (222), video encoder 20 may determine if any additional most-probable modes in the group of all possible most probable modes has not yet been checked (226). That is, video encoder 20 may not retain the selected most-probable mode as the mode having the lowest approximate cost of all possible most probable modes.

If, however, video encoder 20 determines that the approximate cost of the selected most probable mode is less than the approximate cost of all the previously checked most probable modes (220), video encoder 20 may set the selected most probable mode as the mode with the lowest approximate cost (224). For instance, video encoder 20 may store the index of the selected most probable mode as the mode with the lowest approximate cost of all evaluated most probable modes. In this way, video encoder 20 may update the most-probable mode associated with the lowest approximate cost when iterating through each most-probable mode in the group of all possible mode probable modes. Consequently, video encoder 20 may use these techniques to search the group of all possible mode probable modes to select the most-probable mode with the lowest approximate cost.

As described above, video encoder 20 may then determine if any additional most-probable modes in the group of all possible most probable modes have not yet been evaluated (226). If additional most probable modes have not yet been evaluated (228), video encoder 20 may select the next unchecked most probable mode (210). If, however, video encoder 20 determines that all most probable modes have been evaluated (230), video encoder 20 may next determine the mode associated with the largest approximate cost include the current set (232).

In FIG. 7B, video encoder 20 may select this mode (e.g., the mode associated with the largest approximate cost include the current set) from the current set (234). Upon selecting the mode, video encoder 20 may determine whether the selected mode from the current set is a most-probable mode (234). If the selected mode is a most probable mode (240), video encoder 20 may select a next mode in the current set. For instance, if the current set of modes is ordered in descending order based on approximate cost and video encoder 20 initially selected the mode associated with the highest approximate cost, video encoder 20 may select the next unevaluated mode in the current set associated with next highest approximate cost (234).

If video encoder 20 determines that the selected mode is not a most probable mode (238), video encoder 20 may determine a difference between the approximate cost of the selected mode from the current set (i.e., a non-most probable mode) and the approximate cost of the most-probable mode previously selected by video encoder 20 at (224) as has having the lowest approximate cost (242). Video encoder 20 may determine whether the difference satisfies a threshold (244). For instance, video encoder may determine whether the difference satisfies a threshold in the following way:

$$\left| \frac{J_M - J}{J} \right| < T$$

where J is the approximate cost of the non-most probable mode, $J_M$ is the approximate cost of the most-probable mode previously selected by video encoder 20 at (224) as has having the lowest approximate cost, and T is a threshold. For instance, the difference may satisfy a threshold when the quotient (e.g., value) is less than the threshold. In a different example, the difference may satisfy a threshold when the quotient is greater than or equal to a threshold.

If video encoder 20 determines that the difference satisfies a threshold (246), video encoder 20 may replace the selected mode of the current set with the most-probable mode previously selected by video encoder 20 at (224) as has having the lowest approximate cost (250). If video encoder 20 determines that the difference does not satisfy a threshold (248), video encoder 20 may not replace the selected mode with the most-probable mode previously selected by video encoder 20 at (224) as has having the lowest approximate cost.

Video encoder 20 may then select a mode from the current set to intra-predict the current block (252). That is, video encoder 20 may perform rate distortion analysis for the current block using the modes included in the current set that has been post-processed in accordance with the operations illustrated in FIGS. 7A and 7B. For example, video encoder 20 may select a mode from the post-processed current set to intra-code the current block. In some examples, video encoder 20 may select a best mode that is associated with the lowest approximate cost from the current set. Upon selecting the mode, video encoder 20 may perform intra-prediction to encode the current block in accordance with selected mode, as further described in example of FIG. 2. In this way, the intra-prediction is based on the approximate cost computed for each intra-prediction mode identified in the post-processed current set of modes from which the best mode is selected by video encoder 20.

In some examples, approximate costs other than SATD cost might be used too, such as the SSD, SAD or estimated bit rates. In some examples, video encoder 20 may perform several iterations of the above techniques until the current set no longer changes. In still other examples, video encoder 20 evaluate less than all of the most probable modes, such as limiting the evaluation to one (when the left PU's intra mode is equal to the above PU's intra mode) or two MPMs (when the left PU's intra mode is not equal to the above PU's intra mode) to reduce the complexity of the search process.

Figure 8:
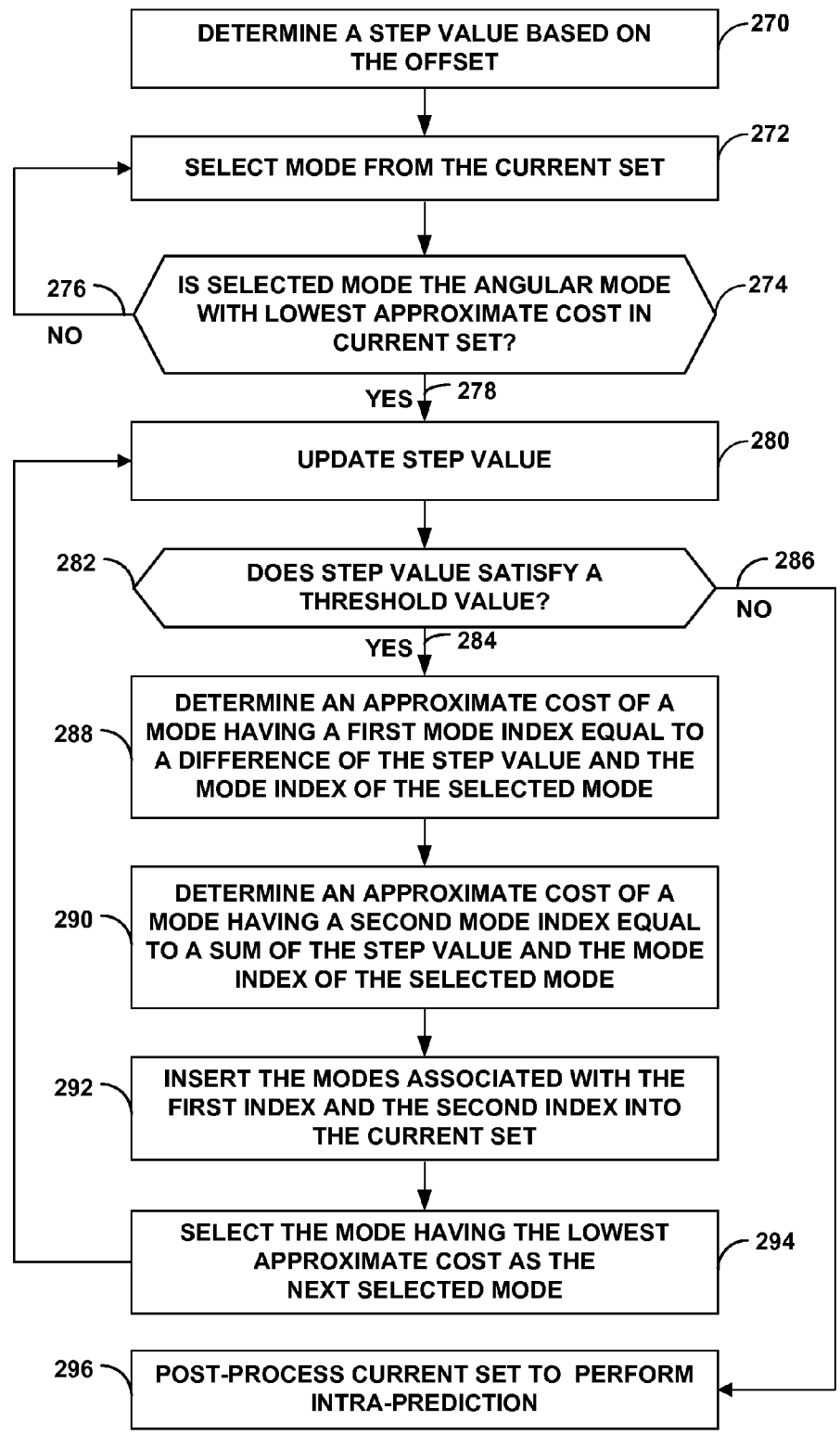
FIG. 8 is a flowchart illustrating exemplary operations of a video coder, such as a video encoder shown in FIG. 2, to refine a current set of intra-prediction modes.

FIG. 8 is a flowchart illustrating exemplary operations of a video coder, such as video encoder 20 shown in FIG. 2, that reduce the complexity of mode selection when selecting from multiple, different prediction modes. Specifically, in FIG. 8, video encoder 20 may refine a set (e.g., a current set) of intra-prediction modes previously generated by video encoder 20. As previously illustrated in FIG. 6, video encoder initially generates a current set of pre-defined intra-prediction modes. However, the modes in the current set may not necessarily have the smallest approximate costs of all possible intra-prediction modes in part because the approximate sampling of the angular modes. In the example operations of FIG. 8, video encoder 20 may implement a refinement process to retrieve one or more modes with lower approximate costs than those modes included in the initially constructed current set.

Initially, video encoder 20 may select an initial mode that is the angular mode M with the lowest approximate cost from the current set. For example, video encoder 20 may initially determine a step value for selecting modes in the refinement process (270). In some examples, the step value may be equal to the offset value used by video encoder 20 to sample the angular modes in FIG. 6. Video encoder 20 may then select a mode from the current set (272). If video encoder 20 determines that the selected mode is not an angular mode (276), video encoder 20 may select the next mode in the current set (272). If video encoder 20 determines that the selected mode is an angular mode and has the lowest approximate cost of angular modes presently included in the current set (278), video encoder 20 may proceed to update the step value. For instance, the updated step value may be equal to the present step value divided by a number. For example, the updated step value may be equal to the present step value divided by 2, i.e., updated set value=(current step value/2).

Video encoder 20 may next determine whether the updated step value satisfies a threshold. For example, video 20 may determine a threshold value to be 0. When the updated step value is less than threshold, video encoder 20 may proceed to post-processing of the current set to perform intra-prediction (296) as further illustrated in FIGS. 7A and 7B.

If the step value does satisfy a threshold (e.g., the step value is greater than 0) (284), video encoder 20 may determine approximate costs of the two neighboring modes M−step and M+step where M may refer to an index of the mode previously selected at (274). For instance, video encoder 20 may determine an approximate cost for a mode that has a mode index equal to a difference of the step value and the mode index of the currently selected mode (i.e., the previously selected angular mode associated with the lowest approximate cost in the initially generated current set) (288). For instance, if the index of the previously selected angular mode associated with the lowest approximate cost in the initially generated current set is M, video encoder 20 may determine an approximate cost for a mode having an index M−step (i.e., the difference between the mode index of M and the step value step).

Video encoder 20 may also determine an approximate cost for a mode that has a mode index equal to a sum of the step value and the mode index of the currently selected mode (i.e., the previously selected angular mode associated with the lowest approximate cost in the initially generated current set) (290). For instance, if the index of the previously selected angular most associated with the lowest approximate cost in the initially generated current set is M, video encoder 20 may determine an approximate cost for a mode having an index M+step (i.e., the sum between the mode index of M and the step value step).

When the index of mode M is a border mode such as 2, or 34, video encoder 20 may clip (i.e., not select) one or more of the neighboring modes, and instead select mode M itself.

Alternatively, video encoder 20 can select modes in an opposite numerical direction. For example if mode M=2, video encoder 20 may obtain neighboring mode M−step by either being clipped to 2, or selecting an adjacent mode in the opposite direction which leads to mode 34. In such examples, video encoder 20 may insert the two neighboring modes, 2 and 34, into the current set in the order of ascending approximate cost depending on whether their approximate costs are smaller than those in the current set.

Upon determining the approximate cost for modes M+step and M−step, video encoder 20 may store each of the two respective modes in the current set. In some examples, video encoder 20 may further store the approximate cost associated with each respective mode in the current set. In any case, video encoder 20 may select the mode having the lowest approximate cost among modes M, M+step, and M−step as the next selected mode to be evaluated by video encoder 20 (294). That is, video encoder 20 may determine the next selected mode using the following expression:

$$\text{Mode} = \arg\left(\min_{m \in \{M-step, M, M+step\}} J(ApproximateCost(m))\right)$$

In some implementation, to further reduce the number of computations in obtaining approximate cost, if the approximate cost of M−step (M+step) is calculated first and it is discovered that the approximate cost of M−step (M+step) is smaller than that of mode M, the further computation of the approximate cost of M+step (M−step) can be skipped and mode M is replaced with M−step (M+step). In some implementation, the initially constructed current set prior to the refinement search may include modes 0, 1, and angular mode 26, and mode 26 is not associated with the lowest approximate cost relative to the approximate costs computed for planar mode 0 and DC mode 1, then the above refinement search can be skipped.

Upon selecting the mode having the lowest approximate cost among modes M, M+step, and M−step, video encoder 20 may update the step value (280). For example, the updated step value may be equal to (current step value/2). As described above, if video encoder 20 determines that the updated step value does not satisfy a threshold (e.g., is less than zero) (286), video encoder 20 may proceed to post-process the current set to perform intra-prediction on the current block (296). If video encoder 20 determines that the updated step value satisfies a threshold (e.g., is greater than zero) (284), video encoder 20 may perform the process illustrated in FIG. 8 again, using the mode having the lowest approximate cost among modes M, M+step, and M−step, as the selected mode.

The example techniques of FIG. 8 may result in a number of approximate cost calculations $N_2$ (SATD) equal to 2 $\log_2$ (offset). Video encoder 20 may therefore iterate through one or more angular modes, refining the current set with angular modes having lower approximate costs, until the threshold is no longer satisfied. In an example case where the sampling offset is 4 in FIG. 6, there may be 4 approximate cost calculations in operations (280)-(294) of FIG. 8 when iterating through the angular intra-prediction modes of the current set. Consequently, the total number of approximate calculations N (SATD) may be expressed as:

$$N(SATD) = N_1(SATD) + N_2(SATD) = 4 + \left\lceil \frac{33}{\text{offset}} \right\rceil - K + 2\log_2(\text{step})$$

In an example where the offset=4, for PU size of 32×32, the length of the cut list may be 4, so techniques of the disclosure may reduce the total number of approximate cost (e.g., SATD) calculations to 13. In this way, techniques of the disclosure may provide a reduction in complexity compared to performing 35 approximate cost calculations in other implementations (e.g., HM).

In some examples, to generate a current set of modes with smaller approximate costs on average, video encoder 20 may repeat the techniques of FIG. 8. For example, if the modes in front of the initial evaluated mode are updated in the previous step, video encoder 20 may repeat operations (280)-(294) for this updated mode (which is now the angular mode with the smallest approximate cost) in the candidate list. If the modes in the front of the initial evaluated mode are not updated in the previous step at (294), video encoded 20 may repeat operations (280)-(294) for the angular mode with the next smallest approximate cost.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    obtaining a plurality of intra-prediction modes available for coding a current block of the video data;
    computing an approximate cost for each intra-prediction mode identified in a current set of intra-prediction modes of the plurality of intra-prediction modes that includes a pre-defined set of intra-prediction modes having at least one intra-prediction mode, wherein the current set of intra-prediction modes includes fewer intra-prediction modes than the plurality of intra-prediction modes available for coding the current block of the video data;
    computing an approximate cost for one or more most probable intra-prediction modes for the current block determined based on intra-prediction modes used to encode one or more neighboring blocks of video data adjacent to the current block;
    comparing each of the approximate costs computed for the one or more most probable intra-prediction modes to a threshold;
    replacing one or more of the intra-prediction modes identified in the current set of intra-prediction modes with the one or more most probable intra-prediction modes based on the comparisons;
    performing a rate distortion analysis with respect to each intra-prediction mode identified in the current set of intra-prediction modes to determine a rate distortion cost for each intra-prediction mode identified in the current set of intra-prediction modes; and
    performing intra-prediction coding with respect to the current block in accordance with one of the intra-prediction modes identified in the current set of intra-prediction modes based on the determined rate distortion costs to encode the current block.

2. The method of claim 1, further comprising:
    searching for additional intra-prediction modes based on computed approximate costs for the intra-prediction modes identified in the current set of intra-prediction modes;
    computing approximate costs for each of the additional intra-prediction modes; and
    adding the additional intra-prediction modes to the current set of intra-prediction modes based on a comparison of the approximate costs computed for at least one of the intra-prediction modes identified in the current set of intra-prediction modes and at least one of the approximate costs computed for the additional intra-prediction modes.

3. The method of claim 1, further comprising:
    determining whether a mode associated with a lowest approximate cost that is included in the current set is an angular mode; and
    in response to determining that the mode associated with the lowest approximate cost that is included in the current set is an angular mode, searching for additional intra-prediction modes based on the approximate costs computed for the intra-prediction modes identified in the current set of intra-prediction modes.

4. The method of claim 1, further comprising:
    selecting an angular mode from a plurality of angular modes;
    determining whether the angular mode is included in a cut list, wherein the cut list comprises at least one intra-prediction mode that occurs with a probability that does not satisfy the threshold; and
    in response to determining that the angular mode is included in the cut list, not determining an approximate cost for the angular mode.

5. The method of claim 4, wherein the angular mode is a first angular mode, the method further comprising:
    determining a second angular mode based at least in part on an offset from the first angular mode;
    in response to determining that the second angular mode is not included in the cut list:
        computing an approximate cost associated with the second angular mode; and
        inserting the second angular mode into the current set.

6. The method of claim 1, further comprising:
    determining a most probable mode associated with a lowest approximate cost from a plurality of most probable modes;
    determining a value based at least in part on a difference between the most probable mode and at least one mode in the current set; and
    in response to determining that the value satisfies the threshold, inserting the most probable mode in the current set to replace the at least one mode in the current set.

7. The method of claim 6,
    wherein the at least one mode in the current set is associated with the largest approximate cost in the current set; and
    wherein the value satisfies the threshold when the value is less than the threshold.

8. The method of claim 1, further comprising:
    determining a first angular mode associated with a lowest approximate cost in the current set, wherein the first angular mode is associated with a first mode index;
    determining a second angular mode associated with a second mode index that comprises a sum of the first angular mode index and a step value; and
    determining a third angular mode associated with a third mode index that comprises a difference of the first angular mode index and the step value.

9. The method of claim 8, wherein the lowest approximate cost associated with the first angular mode is a first approximate cost, the method further comprising:
    determining a second approximate cost associated with the second angular mode;
    determining a third approximate cost associated with the third angular mode; and
    in response to determining that at least one of the second or third approximate costs is less than the first approximate cost, inserting the second or third mode associated respectively with the at least one of the second or third approximate costs that is less than the first approximate cost into the current set to replace first mode.

10. The method of claim 9, wherein the at least one of the second or third mode inserted into the current set is a selected mode, the method further comprising:
   determining an updated step value that is based at least in part on the step value and the selected mode;
   in response to determining that the updated step value satisfies the threshold, selecting a mode associated with a lowest full rate distortion cost in the current set to perform intra-prediction coding with respect to the current block; and
   in response to determining that the updated step value does not satisfy the threshold:
      determining a fourth angular mode associated with a fourth mode index that comprises a sum of an index associated with the selected mode and the updated step value; and
      determining a fifth angular mode associated with a fifth mode index that comprises a difference of the index associated with the selected mode and the updated step value, and
      in response to determining that at least one of a fourth approximate cost of the fourth angular mode or a fifth approximate cost of the fifth angular mode is less than an approximate cost associated with the selected mode, inserting the fourth or fifth mode associated respectively with the at least one of the fourth or fifth approximate costs that is less than the approximate cost associated with the selected mode into the current set.

11. A video coding device configured to perform an intra-prediction process to code video data, the video coding device comprising:
   a memory configured to store a current block of video data; and
   a processor configured to:
      obtain a plurality of intra-prediction modes available for coding the current block of the video data;
      compute an approximate cost for each intra-prediction mode identified in a current set of intra-prediction modes of the plurality of intra-prediction modes that includes a pre-defined set of intra-prediction modes having at least one intra-prediction mode, wherein the current set of intra-prediction modes includes fewer intra-prediction modes than the plurality of intra-prediction modes available for coding the current block of the video data;
      compute an approximate cost for one or more most probable intra-prediction modes for the current block determined based on intra-prediction modes used to encode one or more neighboring blocks of video data adjacent to the current block;
      compare each of the approximate costs computed for the one or more most probable intra-prediction modes to a threshold;
      replace one or more of the intra-prediction modes identified in the current set of intra-prediction modes with the one or more most probable intra-prediction modes based on the comparisons;
      perform a rate distortion analysis with respect to each intra-prediction mode identified in the current set of intra-prediction modes to determine a rate distortion cost for each intra-prediction mode identified in the current set of intra-prediction modes; and
      perform intra-prediction coding with respect to the current block in accordance with one of the intra-prediction modes identified in the current set of intra-prediction modes based on the determined rate distortion costs to encode the current block.

12. The video coding device of claim 11, wherein the processor is further configured to:
   search for additional intra-prediction modes based on computed approximate costs for the intra-prediction modes identified in the current set of intra-prediction modes;
   compute approximate costs for each of the additional intra-prediction modes; and
   add the additional intra-prediction modes to the current set of intra-prediction modes based on a comparison of the approximate costs computed for at least one of the intra-prediction modes identified in the current set of intra-prediction modes and at least one of the approximate costs computed for the additional intra-prediction modes.

13. The video coding device of claim 11, wherein the processor is further configured to:
   determine whether a mode associated with a lowest approximate cost that is included in the current set is an angular mode; and
   in response to determining that the mode associated with the lowest approximate cost that is included in the current set is an angular mode, search for additional intra-prediction modes based on the approximate costs computed for the intra-prediction modes identified in the current set of intra-prediction modes.

14. The video coding device of claim 11, wherein the processor is further configured to:
   select an angular mode from a plurality of angular modes;
   determine whether the angular mode is included in a cut list, wherein the cut list comprises at least one intra-prediction modes that occurs with a probability that does not satisfy the threshold; and
   in response to determining that the angular mode is included in the cut list, not determine an approximate cost for the angular mode.

15. The video coding device of claim 14, wherein the angular mode is a first angular mode, wherein the processor is further configured to:
   determine a second angular mode based at least in part on an offset from the first angular mode;
   in response to determining that the second angular mode is not included in the cut list:
   compute an approximate cost associated with the second angular mode; and
   insert the second angular mode into the current set.

16. The video coding device of claim 11, wherein the processor is further configured to:
   determine a most probable mode associated with a lowest approximate cost from a plurality of most probable modes;
   determine a value based at least in part on a difference between the most probable mode and at least one mode in the current set; and
   in response to determining that the value satisfies the threshold, insert the most probable mode in the current set to replace the at least one mode in the current set.

17. The video coding device of claim 16,
   wherein the at least one mode in the current set is associated with the largest approximate cost in the current set; and
   wherein the value satisfies the threshold when the value is less than the threshold.

18. The video coding device of claim 11, wherein the processor is further configured to:

determine a first angular mode associated with a lowest approximate cost in the current set, wherein the first angular mode is associated with a first mode index;

determine a second angular mode associated with a second mode index that comprises a sum of the first angular mode index and a step value; and determine a third angular mode associated with a third mode index that comprises a difference of the first angular mode index and the step value.

19. The video coding device of claim 18, wherein the lowest approximate cost associated with the first angular mode is a first approximate cost, wherein the processor is further configured to:

determine a second approximate cost associated with the second angular mode;

determine a third approximate cost associated with the third angular mode; and in response to determining that at least one of the second or third approximate costs is less than the first approximate cost, insert the second or third mode associated respectively with the at least one of the second or third approximate costs that is less than the first approximate cost into the current set to replace first mode.

20. The video coding device of claim 19, wherein the at least one of the second or third mode inserted into the current set is a selected mode, wherein the processor is further configured to:

determine an updated step value that is based at least in part on the step value and the selected mode;

in response to determining that the updated step value satisfies the threshold, select a mode associated with a lowest full rate distortion cost in the current set to perform intra-prediction coding with respect to the current block; and in response to determining that the updated step value does not satisfy the threshold:

determine a fourth angular mode associated with a fourth mode index that comprises a sum of an index associated with the selected mode and the updated step value; and determine a fifth angular mode associated with a fifth mode index that comprises a difference of the index associated with the selected mode and the updated step value, and in response to determining that at least one of a fourth approximate cost of the fourth angular mode or a fifth approximate cost of the fifth angular mode is less than an approximate cost associated with the selected mode, insert the fourth or fifth mode associated respectively with the at least one of the fourth or fifth approximate costs that is less than the approximate cost associated with the selected mode into the current set.

21. A video coding device configured to perform an intra-prediction process to code video data, the video coding device comprising:

means for obtaining a plurality of intra-prediction modes available for coding a current block of the video data;

means for computing an approximate cost for each intra-prediction mode identified in a current set of intra-prediction modes of the plurality of intra-prediction modes that includes a pre-defined set of intra-prediction modes having at least one intra-prediction mode, wherein the current set of intra-prediction modes includes fewer intra-prediction modes than the plurality of intra-prediction modes available for coding the current block of the video data;

means for computing an approximate cost for one or more most probable intra-prediction modes for the current block determined based on intra-prediction modes used to encode one or more neighboring blocks of video data adjacent to the current block;

means for comparing each of the approximate costs computed for the one or more most probable intra-prediction modes to a threshold;

means for replacing one or more of the intra-prediction modes identified in the current set of intra-prediction modes with the one or more most probable intra-prediction modes based on the comparisons;

means for performing a rate distortion analysis with respect to each intra-prediction mode identified in the current set of intra-prediction modes to determine a rate distortion cost for each intra-prediction mode identified in the current set of intra-prediction modes; and means for performing intra-prediction coding with respect to the current block in accordance with one of the intra-prediction modes identified in the current set of intra-prediction modes based on the determined rate distortion costs to encode the current block.

22. The video coding device of claim 21, further comprising:

means for searching for additional intra-prediction modes based on computed approximate costs for the intra-prediction modes identified in the current set of intra-prediction modes;

means for computing approximate costs for each of the additional intra-prediction modes; and means for adding the additional intra-prediction modes to the current set of intra-prediction modes based on a comparison of the approximate costs computed for at least one of the intra-prediction modes identified in the current set of intra-prediction modes and at least one of the approximate costs computed for the additional intra-prediction modes.

23. The video coding device of claim 21, further comprising:

means for determining whether a mode associated with a lowest approximate cost that is included in the current set is an angular mode; and means for searching for additional intra-prediction modes based on the approximate costs computed for the intra-prediction modes identified in the current set of intra-prediction modes, in response to determining that the mode associated with the lowest approximate cost that is included in the current set is an angular mode.

24. The video coding device of claim 21, further comprising:

means for selecting an angular mode from a plurality of angular modes;

means for determining whether the angular mode is included in a cut list, wherein the cut list comprises at least one intra-prediction modes that occurs with a probability that does not satisfy the threshold; and means for not determining an approximate cost for the angular mode, in response to determining that the angular mode is included in the cut list.

25. The video coding device of claim 24, wherein the angular mode is a first angular mode, the video coding device further comprising:

means for determining a second angular mode based at least in part on an offset from the first angular mode;

in response to determining that the second angular mode is not included in the cut list:

means for computing an approximate cost associated with the second angular mode; and means for inserting the second angular mode into the current set.

26. The video coding device of claim 21, further comprising:

means for determining a most probable mode associated with a lowest approximate cost from a plurality of most probable modes;

means for determining a value based at least in part on a difference between the most probable mode and at least one mode in the current set; and means for inserting the most probable mode in the current set to replace the at least one mode in the current set, in response to determining that the value satisfies the threshold.

27. The video coding device of claim 26, wherein the at least one mode in the current set is associated with the largest approximate cost in the current set; and wherein the value satisfies the threshold when the value is less than the threshold.

28. The video coding device of claim 21, further comprising:

means for determining a first angular mode associated with a lowest approximate cost in the current set, wherein the first angular mode is associated with a first mode index;

means for determining a second angular mode associated with a second mode index that comprises a sum of the first angular mode index and a step value; and means for determining a third angular mode associated with a third mode index that comprises a difference of the first angular mode index and the step value.

29. The video coding device of claim 28, wherein the lowest approximate cost associated with the first angular mode is a first approximate cost, the video coding device further comprising:

means for determining a second approximate cost associated with the second angular mode;

means for determining a third approximate cost associated with the third angular mode; and means for inserting the second or third mode associated respectively with the at least one of the second or third approximate costs that is less than the first approximate cost into the current set to replace first mode, in response to determining that at least one of the second or third approximate costs is less than the first approximate cost.

30. The video coding device of claim 29, wherein the at least one of the second or third mode inserted into the current set is a selected mode, the video coding device further comprising:

means for determining an updated step value that is based at least in part on the step value and the selected mode;

means for selecting a mode associated with a lowest full rate distortion cost in the current set to perform intra-prediction coding with respect to the current block, in response to determining that the updated step value satisfies the threshold; and in response to determining that the updated step value does not satisfy the threshold:

means for determining a fourth angular mode associated with a fourth mode index that comprises a sum of an index associated with the selected mode and the updated step value; and means for determining a fifth angular mode associated with a fifth mode index that comprises a difference of the index associated with the selected mode and the updated step value, and means for inserting the fourth or fifth mode associated respectively with the at least one of the fourth or fifth approximate costs that is less than the approximate cost associated with the selected mode into the current set, in response to determining that at least one of a fourth approximate cost of the fourth angular mode or a fifth approximate cost of the fifth angular mode is less than an approximate cost associated with the selected mode.

31. A non-transitory computer-readable storage medium having instruction stored thereon that, when executed, cause one or more processors to:

obtain a plurality of intra-prediction modes available for coding a current block of the video data;

compute an approximate cost for each intra-prediction mode identified in a current set of intra-prediction modes of the plurality of intra-prediction modes that includes a pre-defined set of intra-prediction modes having at least one intra-prediction mode, wherein the current set of intra-prediction modes includes fewer intra-prediction modes than the plurality of intra-prediction modes available for coding the current block of the video data;

compute an approximate cost for one or more most probable intra-prediction modes for the current block determined based on intra-prediction modes used to encode one or more neighboring blocks of video data adjacent to the current block;

compare each of the approximate costs computed for the one or more most probable intra-prediction modes to a threshold;

replace one or more of the intra-prediction modes identified in the current set of intra-prediction modes with the one or more most probable intra-prediction modes based on the comparisons;

perform a rate distortion analysis with respect to each intra-prediction mode identified in the current set of intra-prediction modes to determine a rate distortion cost for each intra-prediction mode identified in the current set of intra-prediction modes; and perform intra-prediction coding with respect to the current block in accordance with one of the intra-prediction modes identified in the current set of intra-prediction modes based on the determined rate distortion costs to encode the current block.

32. The non-transitory computer-readable storage medium of claim 31, wherein the instructions, when executed, cause the one or more processors to:

search for additional intra-prediction modes based on computed approximate costs for the intra-prediction modes identified in the current set of intra-prediction modes;

compute approximate costs for each of the additional intra-prediction modes; and add the additional intra-prediction modes to the current set of intra-prediction modes based on a comparison of the approximate costs computed for at least one of the intra-prediction modes identified in the current set of intra-prediction modes and at least one of the approximate costs computed for the additional intra-prediction modes.

33. The non-transitory computer-readable storage medium of claim 31, wherein the instructions, when executed, cause the one or more processors to:

determine whether a mode associated with a lowest approximate cost that is included in the current set is an angular mode; and search for additional intra-prediction modes based on the approximate costs computed for the intra-prediction modes identified in the current set of intra-prediction modes, in response to determining that the mode associated with the lowest approximate cost that is included in the current set is an angular mode.

34. The non-transitory computer-readable storage medium of claim 31, wherein the instructions, when executed, cause the one or more processors to:

select an angular mode from a plurality of angular modes;

determine whether the angular mode is included in a cut list, wherein the cut list comprises at least one intra-prediction modes that occurs with a probability that does not satisfy the threshold; and not determine an approximate cost for the angular mode, in response to determining that the angular mode is included in the cut list.

35. The non-transitory computer-readable storage medium of claim 34, wherein the angular mode is a first angular mode, wherein the instructions, when executed, cause the one or more processors to:

determine a second angular mode based at least in part on an offset from the first angular mode;

in response to determining that the second angular mode is not included in the cut list:

compute an approximate cost associated with the second angular mode; and insert the second angular mode into the current set.

36. The non-transitory computer-readable storage medium of claim 31, wherein the instructions, when executed, cause the one or more processors to:

determine a most probable mode associated with a lowest approximate cost from a plurality of most probable modes;

determine a value based at least in part on a difference between the most probable mode and at least one mode in the current set; and insert the most probable mode in the current set to replace the at least one mode in the current set, in response to determining that the value satisfies the threshold.

37. The non-transitory computer-readable storage medium of claim 36, wherein the at least one mode in the current set is associated with the largest approximate cost in the current set; and wherein the value satisfies the threshold when the value is less than the threshold.

38. The non-transitory computer-readable storage medium of claim 31, wherein the instructions, when executed, cause the one or more processors to:

determine a first angular mode associated with a lowest approximate cost in the current set, wherein the first angular mode is associated with a first mode index;

determine a second angular mode associated with a second mode index that comprises a sum of the first angular mode index and a step value; and determine a third angular mode associated with a third mode index that comprises a difference of the first angular mode index and the step value.

39. The non-transitory computer-readable storage medium of claim 31, wherein the lowest approximate cost associated with the first angular mode is a first approximate cost, wherein the instructions, when executed, cause the one or more processors to:

determine a second approximate cost associated with the second angular mode;

determine a third approximate cost associated with the third angular mode; and insert the second or third mode associated respectively with the at least one of the second or third approximate costs that is less than the first approximate cost into the current set to replace first mode, in response to determining that at least one of the second or third approximate costs is less than the first approximate cost.

40. The non-transitory computer-readable storage medium of claim 39, wherein the at least one of the second or third mode inserted into the current set is a selected mode, wherein the instructions, when executed, cause the one or more processors to:

determine an updated step value that is based at least in part on the step value and the selected mode;

select a mode associated with a lowest full rate distortion cost in the current set to perform intra-prediction coding with respect to the current block, in response to determining that the updated step value satisfies the threshold; and in response to determining that the updated step value does not satisfy the threshold:

determine a fourth angular mode associated with a fourth mode index that comprises a sum of an index associated with the selected mode and the updated step value; and determine a fifth angular mode associated with a fifth mode index that comprises a difference of the index associated with the selected mode and the updated step value, and in response to determining that at least one of a fourth approximate cost of the fourth angular mode or a fifth approximate cost of the fifth angular mode is less than an approximate cost associated with the selected mode, insert the fourth or fifth mode associated respectively with the at least one of the fourth or fifth approximate costs that is less than the approximate cost associated with the selected mode into the current set.

* * * * *